(12) United States Patent
Abdelkhalik et al.

(10) Patent No.: US 10,344,736 B2
(45) Date of Patent: *Jul. 9, 2019

(54) PSEUDO-SPECTRAL METHOD TO CONTROL THREE-DEGREE-OF-FREEDOM WAVE ENERGY CONVERTERS

(71) Applicants: National Technology & Engineering Solutions of Sandia, LLC, Albuquerque, NM (US); Michigan Technological University, Houghton, MI (US)

(72) Inventors: Ossama Abdelkhalik, Houghton, MI (US); Giorgio Bacelli, Albuquerque, NM (US); Shangyan Zou, Houghton, MI (US); Rush D. Robinett, III, Tijeras, NM (US); David G. Wilson, Tijeras, NM (US); Ryan G. Coe, Albuquerque, NM (US)

(73) Assignees: National Technology & Engineering Solution of Sandia, LLC, Albuquerque, NC (US); Michigan Technological University, Houghton, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/837,853

(22) Filed: Dec. 11, 2017

(65) Prior Publication Data
US 2018/0163690 A1   Jun. 14, 2018

Related U.S. Application Data

(60) Provisional application No. 62/432,427, filed on Dec. 9, 2016.

(51) Int. Cl.
*F03B 13/10* (2006.01)
*F03B 13/12* (2006.01)
(Continued)

(52) U.S. Cl.
CPC ............ *F03B 13/183* (2013.01); *F03B 13/16* (2013.01); *F03B 15/00* (2013.01); *F03B 15/20* (2013.01);
(Continued)

(58) Field of Classification Search
CPC ........... F03B 13/16; F03B 15/00; F03B 15/20
See application file for complete search history.

(56) References Cited

U.S. PATENT DOCUMENTS 4,189,918 A * 2/1980 Moody ................. F03B 13/142
290/53
4,220,044 A * 9/1980 LeBlanc .............. G01C 13/002
73/170.01
(Continued)

OTHER PUBLICATIONS

Yavuz, Hakan, "On Control of a Pitching and Surging Wave Energy Converter", 2011, International Journal of Green Energy, 8, 555-584 (Year: 2011).*
(Continued)

*Primary Examiner* — Tulsidas C Patel
*Assistant Examiner* — Thomas K Quigley
(74) *Attorney, Agent, or Firm* — Kevin W. Bieg

(57) ABSTRACT

The invention provides optimal control of a three-degree-of-freedom wave energy converter using a pseudo-spectral control method. The three modes are the heave, pitch and surge. A dynamic model is characterized by a coupling between the pitch and surge modes, while the heave is decoupled. The heave, however, excites the pitch motion through nonlinear parametric excitation in the pitch mode. The invention can use a Fourier series as basis functions to approximate the states and the control. For the parametric excited case, a sequential quadratic programming approach can be implemented to numerically solve for the optimal control. The numerical results show that the harvested energy from three modes is greater than three times the
(Continued)

harvested energy from the heave mode alone. Moreover, the harvested energy using a control that accounts for the parametric excitation is significantly higher than the energy harvested when neglecting this nonlinear parametric excitation term.

2 Claims, 21 Drawing Sheets

(51) Int. Cl.
    *F03B 13/18*     (2006.01)
    *F03B 15/20*     (2006.01)
    *G02F 1/39*     (2006.01)
    *G06F 1/02*     (2006.01)
    *H01J 49/42*     (2006.01)
    *F03B 13/16*     (2006.01)
    *F03B 15/00*     (2006.01)

(52) U.S. Cl.
    CPC .................. *G02F 1/39* (2013.01); *G06F 1/02* (2013.01); *G06F 1/022* (2013.01); *H01J 49/4275* (2013.01); *F05B 2250/43* (2013.01); *F05B 2270/20* (2013.01); *Y02E 10/38* (2013.01)

(56) References Cited

U.S. PATENT DOCUMENTS

| | | | | |
|---|---|---|---|---|
| 4,468,205 A * | 8/1984 | Pedersen | ............... | B63B 22/021 114/230.14 |
| 4,867,211 A * | 9/1989 | Dodge | ............... | B63B 27/24 141/279 |
| 4,938,630 A * | 7/1990 | Karsan | ............... | B63B 21/50 114/264 |
| 4,996,840 A * | 3/1991 | Marx | ............... | F03B 13/183 60/398 |
| 5,435,262 A * | 7/1995 | Grinius | ............... | B63B 22/021 114/264 |
| 6,631,300 B1 * | 10/2003 | Nayfeh | ............... | B66C 13/063 212/271 |
| 7,909,536 B2 * | 3/2011 | Dick | ............... | B63B 35/44 405/76 |
| 7,989,975 B2 * | 8/2011 | Clement | ............... | F03B 13/20 290/53 |
| 9,140,231 B1 * | 9/2015 | Wilson | ............... | F03B 15/00 |
| 2007/0266704 A1 * | 11/2007 | Bull | ............... | B63B 35/4406 60/398 |
| 2010/0148504 A1 * | 6/2010 | Gerber | ............... | F03B 13/16 290/42 |
| 2011/0089696 A1 * | 4/2011 | Davis | ............... | F03B 13/1865 290/53 |
| 2011/0093092 A1 * | 4/2011 | Choi | ............... | A47C 1/12 700/11 |
| 2013/0025937 A1 * | 1/2013 | Pilgrim | ............... | E21B 21/01 175/24 |
| 2013/0113211 A1 * | 5/2013 | Rohrer | ............... | F03B 13/182 290/42 |
| 2014/0045394 A1 * | 2/2014 | Woldring | ............... | B63B 21/20 441/3 |
| 2015/0152836 A1 * | 6/2015 | Stansby | ............... | F03B 13/16 60/497 |
| 2017/0226984 A1 * | 8/2017 | Gregory | ............... | F03B 13/1895 |
| 2017/0298899 A1 * | 10/2017 | Abdelkhalik | ............... | F03B 15/00 |
| 2017/0371056 A1 * | 12/2017 | Toennessen | ............... | B63B 21/66 |
| 2018/0163691 A1 | 6/2018 | Abdelkhalik et al. | | |
| 2018/0164754 A1 | 6/2018 | Wilson et al. | | |
| 2018/0164755 A1 | 6/2018 | Abdelkhalik et al. | | |

OTHER PUBLICATIONS

Abdelkhalik, O. et al., "Estimation of excitation forces for wave energy converters control using pressure measurements", Int. J. Control 90(8), (2016), pp. 1793-1805.

Cretel, J.A.M. et al., "Maximisation of Energy Capture by a Wave-Energy Point Absorber using Model Predictive Control", Proceedings of the 18th World Congress, The International Federation of Automatic Control, Milano (Italy), IFAC Proceedings 44.1, 3714, (2011), pp. 3714-3721.

Falnes, J., "A review of wave-energy extraction", J., Marine Structures 20(4), (2007), pp. 185-201.

Halliday, J.R. et al., "An application of the Fast Fourier Transform to the short-term prediction of sea wave behaviour",Renewable Energy 36(6), (2011), pp. 1685-1692.

Hals, J. et al., "Constrained Optimal Control of a Heaving Buoy Wave-Energy Converter", J. Offshore Mech. Arctic Eng. 133(1) (2011), pp. 011401-1-011401-15.

Hals, J. et al., "A Comparison of Selected Strategies for Adaptive Control of Wave Energy Converters", J. Offshore Mech. Arctic Eng. 133(3), 031101 (2011), pp. 031101-1-031101-12.

Villegas, C. and Van Der Schaaf, H., "Implementation of a Pitch Stability Control for a Wave Energy Converter," Proc. 10th Euro. Wave and Tidal Energy Conf. Southampton, UK, (2011), 6 pages.

Zaghari, B. et al., "Energy Harvesting Using Parametric Excitation," Theme Conference, Institute of Sound and Vibration Research, Univ. of Southampton, United Kingdom, May 2014.

* cited by examiner

PSEUDO-SPECTRAL METHOD TO CONTROL THREE-DEGREE-OF-FREEDOM WAVE ENERGY CONVERTERS

CROSS-REFERENCE TO RELATED APPLICATIONS

This application claims the benefit of U.S. Provisional Application No. 62/432,427, filed Dec. 9, 2016, which is incorporated herein by reference. This application is related to U.S. application Ser. No. 15/837,885, titled "Model predictive control of parametric excited pitch-surge modes in wave energy converters," filed of even date with this application, which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to wave energy converters and, in particular, to the control of three-degree-of-freedom wave energy converters using a pseudo-spectral method.

BACKGROUND OF THE INVENTION

Despite its potential, wave energy extraction technology is not yet mature due to a few challenges. The Department of Energy reported in 2012 that the world wave installed capacity is less than 5 MW, mostly produced on a pre-commercial basis. See U.S. Department of Energy, "Marine and hydrokinetic technology database," December, 2012. One of the main challenges is the design of an effective control strategy that enables the harvesting of higher levels of energy. Another challenge is the limitation of the existing theory and practice. Energy harvesting is about the wave energy converter (WEC) motion and control. The fundamental theory that is being used to describe this motion is inherited from ship hydrodynamics. Ships are usually designed so as to not move in the vertical (heave) direction or rotate in the pitch or roll directions. Hence most theories, designs, and control algorithms are based on the assumption of small motion in these directions, which yield the linear dynamic models. WEC devices, however, need to heave and/or pitch in order to harvest energy. Several references have motivated the use of a multiple-degree-of-freedom (MDOF) WEC as opposed to a single DOF WEC. See D. V. Evans, *J. Fluid Mech.* 77(1), 1 (1976). Evans extended the results of two-dimensional WECs to bodies in channels and accounts for the body orientation on the energy harvesting. D. V. Evans, "Some theoretical aspects of three-dimensional wave energy absorbers." *Proceedings of the first symposium on wave energy utilization*, Chalmers University of Technology, Gothenburg, Sweden, pp 77-106, September 1979. In fact, French and Bracewell point out that the power that can be extracted from a mode that is antisymmetric to the wave (such as pitch and surge) is twice as much as can be extracted from a mode that is symmetric (such as heave). See M. J. French and R. H. Bracewell, "P. S. FROG A point-absorber wave energy converter working in a pitch/surge mode," *Proceedings of The Fifth International Conference on Energy Options: the role of alternatives in the world energy scene*, University of Reading, Reading, Berkshire, UK, IEE, September 1987. Yavuz recently modeled the pitch-surge motions assuming no heave motion; hence there is no effect from the heave motion on the pitch-surge power conversion. See Hakan Yavuz, *Int. J. Green Ener.* 8, 555 (2011). The mathematical model used for the motions in these two DOFs is coupled through mass and damping only; there is no coupling in the stiffness. It has been observed, however, that floating structures can be subject to parametric instability arising from variations of the pitch restoring coefficient. See Carlos Villegas and Haite van der Schaaf, "Implementation of a pitch stability control for a wave energy converter," *Proceedings of* 10*th Euro. Wave and Tidal Energy Conference*, Southampton, U K, 2011. Villegas and Haite describe an experimental heaving buoy for which the parametric excitation causes the pitch motion to grow resulting in instability. A harmonic balance approach is implemented to cancel this parametric resonance and results of tank experiments are described.

As described herein, the equations of motion for a 3-DOF WEC have a second order term that causes the heave motion to parametric excite the pitch mode; and the pitch and surge motions are coupled. For relatively large heave motions, which are needed for higher energy harvesting, it is not possible to neglect this parametric excitation term. Rather, the controller of the present invention leverages this nonlinear term for optimum energy harvesting.

SUMMARY OF THE INVENTION

This present invention is directed to optimal pseudo-spectral control of a three-degree-of-freedom wave energy converter. The three modes are the heave, pitch and surge. The dynamic model is characterized by a coupling between the pitch and surge modes, while the heave is decoupled. The model is used as part of the feedforward prediction portion of the control system. The heave, however, excites the pitch motion through nonlinear parametric excitation in the pitch mode. This feedforward prediction algorithm uses Fourier series as a basis function to approximate the states and the control. For comparison, a simplified model is first used where the parametric excitation term is neglected and a closed form solution for the optimal control is developed. For the parametric excited case, a sequential quadratic programming approach can be implemented to solve for the optimal control numerically.

The numerical simulation results demonstrate proof-of-concept that the harvested energy from three modes is greater than three times the harvested energy from the heave mode alone. Moreover, the harvested energy using a control that accounts for the parametric excitation is significantly higher than the energy harvested when neglecting this nonlinear parametric excitation term. The results confirm the feasibility of using a three degree-of-freedom power take-off unit to harvest more than three times the amount of energy that can be harvested with a one-degree-of-freedom heave power take-off unit. This direct transcription method is computationally efficient and can be used as part of the feedforward prediction portion in real time implementations. Feedback of either position/velocity and wave prediction information is a prerequisite.

BRIEF DESCRIPTION OF THE DRAWINGS

The detailed description will refer to the following drawings, wherein like elements are referred to by like numbers.

DETAILED DESCRIPTION OF THE INVENTION

In designing the optimal control, it is important to note that the WEC buoy is excited by waves which are stochastic in nature. The Dynamic Programming (DP) approach is one method that can be implemented to search for the optimal control in such a stochastic system. The DP approach, however, is computationally expensive and suffers the curse of dimensionality. Indirect methods for optimal control seek a solution to the closed system of necessary conditions of optimality. Direct methods for optimal control discretize the control problem, then apply non-linear programming (NLP) techniques to the resulting finite-dimensional optimization problem. Due to control parameterization, direct methods provide only approximate solutions. Therefore, the present invention implements a pseudo-spectral approach to computing the optimal control, where a Fourier series basis is used to approximate the control, the states, and the objective function. The objective function maximizes the extracted energy. Two exemplary cases are described herein; the first case assumes a linear dynamic model where no parametric excitation is modeled. The second case uses a model that has parametric excitation. The obtained results are compared to the results obtained using a nonlinear model predictive control approach. The invention can be used with a variety of WECs and controllers thereof.

For example, various technologies pertaining to designing and implementing a controller in a WEC, wherein the controller is configured to improve efficiency of the WEC by expanding a wave frequency spectrum over which the WEC can efficiently absorb wave energy are described in related U.S. Pat. No. 9,140,231, which is incorporated herein by reference.

Figure 1:
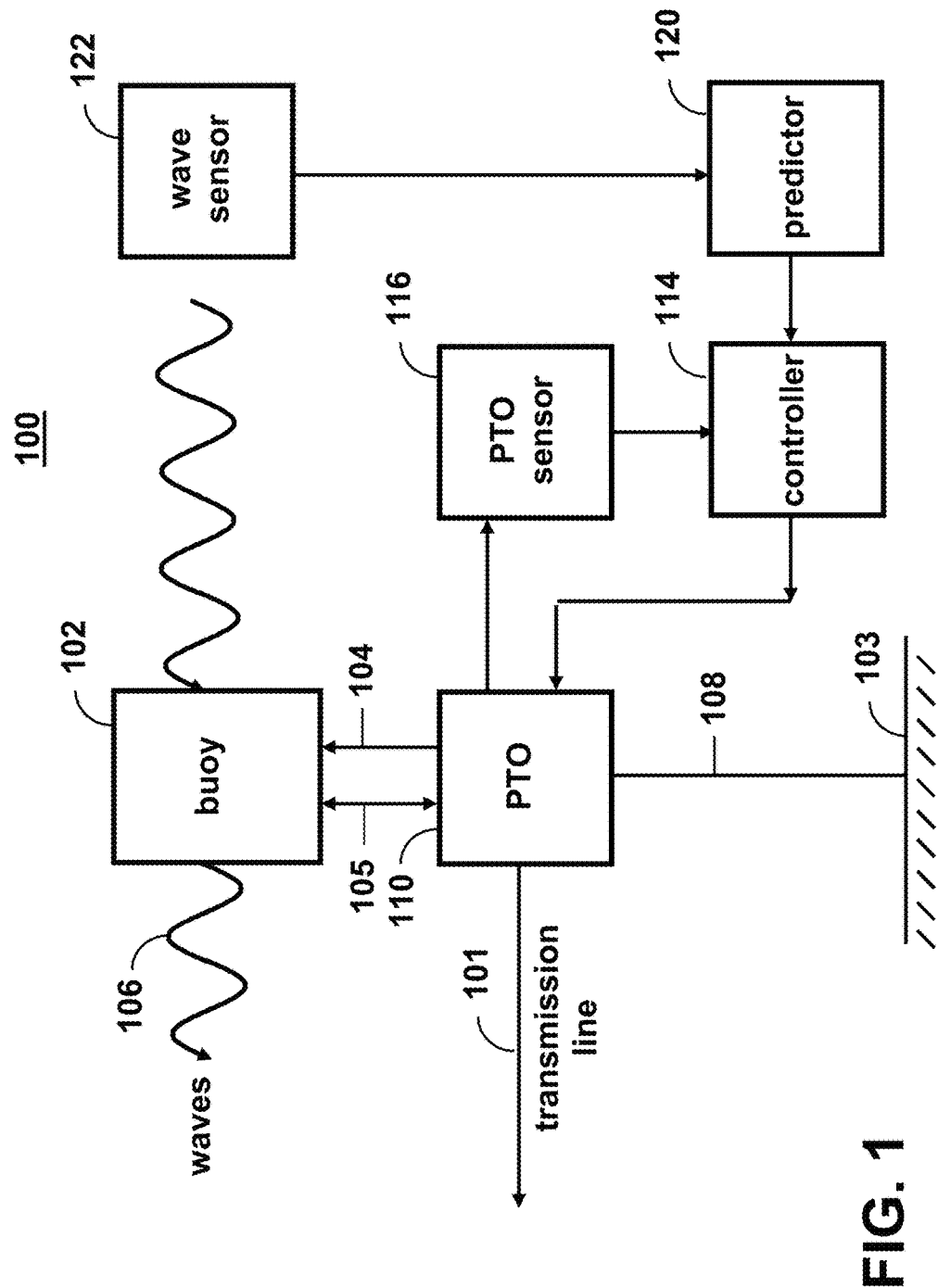
FIG. 1 is a schematic illustration of a wave energy converter.

An exemplary WEC 100 is illustrated in FIG. 1. The WEC 100 is intended to be placed in a body of water (e.g., the ocean) and subjected to wave motion of varying amplitude and frequency. The WEC 100 can be classified as a resonant responder, as its structural design can have a resonance frequency that is within a predominant wave frequency spectrum of the body of water in which the WEC 100 is deployed. When a series of waves of the resonance frequency impact the WEC 100, the WEC 100 will resonantly respond, thus absorbing a relatively large amount of energy of the waves that are impacting the WEC. Thus, the WEC 100 can be configured to convert incident energy existent in waves into mechanical energy. The mechanical energy can then be transformed into electrical energy, and can be transmitted by way of a transmission line to a substation or other suitable energy or transmission system. Additionally, while not shown, the WEC 100 may include local storage, such as a battery, a capacitor bank, or the like, that can at least temporarily retain DC energy in the WEC 100. Further, the WEC 100 can extract such stored energy when needed, wherein extracted energy can be used to control the operation of the WEC 100, to provide power to lights on the WEC, to provide power to sensors on the WEC, to provide power to a processor or circuit that processes sensor data, to provide power to a transceiver that communicates to another system or WEC, etc.

The exemplary WEC 100 shown includes a buoy 102 that is mechanically coupled to a reference, in this example a stationary reference such as an anchor to an ocean-floor mooring 103. The buoy 102 is designed to generally move with 3 DOFs (up and down along a vertical axis in a heaving motion, in an up/down rotation about a center-of-gravity in a pitching motion, and back-and-forth, side-to-side in a surging motion) in phase with waves 106 in a body of water. Such body of water can be an ocean, a sea, a relatively large lake, etc. As shown, the reference can remain stationary (e.g., anchored to an ocean-floor mooring) as the buoy 102 moves. While the exemplary WEC 100 shown is the simple case of a one-body resonant WEC, aspects described herein are not limited to a one-body absorber. Rather, aspects described herein can be utilized in any resonant WEC, including a two-body resonant WEC, wherein the buoy moves relative to a moveable spar, or an n-body resonant WEC.

A mechanical energy conversion chain 108 couples the buoy 102 to the reference. The mechanical energy conversion chain 108 includes a power take-off (PTO) 110. The PTO 110 is configured to convert the motion 105 of the buoy 102 to electrical energy, which can then be output by way of the transmission line 101. For example, the PTO 110 can include mechanical elements that are generally utilized, for example, to translate the motion 105 of the buoy 102 into rotary motion. The PTO 110 can further include a generator that is configured to translate the rotary motion into electrical energy. Exemplary mechanical elements that can be included in the PTO 110 include, but are not limited to, a rack and pinion system, a hydraulic system, a flywheel, or a ball screw. Additional elements that can be included in the PTO 110 include, but are not limited to, a water turbine, an air turbine, a linear generator, etc.

As indicated above, the WEC 100 can be structurally designed to have a resonant frequency within a predominant spectral range of waves 106 in the body of water. Accordingly, when waves corresponding to the resonant frequency of the WEC 100 impact the WEC 100, relatively large amplitude motion is created between the buoy 102 and the reference 103, wherein such motion is translated by the PTO 110 into electrical energy. Conventional WECs, however, tend to be relatively inefficient when waves in the body of water do not correspond to the resonant frequency of the WEC 100.

To that end, the WEC 100 can include a controller 114 that is configured to control operation of the PTO 110 to cause the PTO 110 to generate larger amounts of electrical energy over time when compared to conventional WECs. The controller 114 outputs control signals that are received by actuators in the PTO 110, and the actuators operate based upon the control signals received from the controller 114. For example, the controller 114 can utilize reactive control techniques, whereby the controller 114 can cause the PTO 110 to act as a motor to affect the displacement between the buoy 102 and the reference 103. Additionally, the controller 114 can utilize adaptive control techniques, such that the controller 114 can consider variations in parameters that affect the operation of the WEC 100. In general, the controller 114 can control the PTO 110 to cause the WEC 100 to remain on resonance when off-resonance waves impact the buoy 102, and can cause the WEC 100 to relatively quickly return to resonance when waves impacting the buoy 102 cause the WEC 100 to go off resonance. To that end, the controller 114 can cause the PTO 110 to exert forces 104 on the buoy 102, wherein the exerted forces are in the direction of the excitation forces exerted on the WEC 100 by an impinging wave. In another example, the controller 114 can cause the PTO 110 to exert forces on the buoy 102 in an opposite direction of excitation forces exerted on the WEC 100 by an impinging wave.

The controller 114 can take into consideration signals from one or more sensors when controlling operation of the PTO 110. For instance, a PTO sensor 116 can output a signal that is indicative of at least one operating parameter of the PTO 110. Such operating parameter may be, for example, an amount of electrical energy being generated by the PTO 110, positions of mechanical elements in the PTO 110, an amount of force being exerted by the PTO 110 on the buoy 102, etc. The sensor 116 can further provide a signal to the controller 114 indicative of a condition of the WEC 100 relative to its environment. For instance, the sensor 116 can be configured to output positional information that indicates a position of the buoy 102 relative to the reference 103, such as an ocean floor-mooring or a spar.

In addition, the WEC can include a predictor 120 that can be or be included in a microprocessor, Application Specific Integrated Circuit (ASIC), Field Programmable Gate Array (FPGA), a System on a Chip (SoC), etc. For instance, a microprocessor can be programmed to perform functionality described below as being performed by the predictor 120. Likewise, an ASIC or FPGA can be designed and/or programmed to perform the functionality described below as being performed by the predictor 120. The predictor 120 predicts a time when a wave will impact buoy 102, as well as an excitation force of the wave at the time the wave is predicted to impact the buoy 102. With more particularity, a wave sensor 122 can be positioned a distance (e.g., 100 meters) from the WEC 100, and can output a signal that is indicative of velocity of a wave, amplitude of the wave, etc. For instance, the wave sensor 122 may have a wireless transceiver thereon, which is configured to transmit the signal to the WEC 100 (and the predictor 120). In another example, the wave sensor 122 can be connected to the predictor 120 by way of a wired connection. The predictor 120 may further receive other signals from sensors that can be indicative of environmental conditions, such as wind speeds, humidity, and the like. The predictor 120 can output the predicted time of impact of the wave with the WEC 100 and predicted excitation force of the wave at the time of impact based upon the above-mentioned signals. Additionally, the predictor 120 can generate the predictions based upon historically observed data pertaining to waves.

The controller 114 receives the predictions from the predictor 120, and controls operation of the PTO 110 based upon the predictions. For instance, the controller 114 can receive the predictions and compute a desired position of the buoy 102 (e.g., elevation) at the time that the wave impacts the buoy 102. The controller 114 outputs control signals to the PTO 110, then, based upon the desired position of the buoy 102 at the future time and current position of the buoy 102, an amount of power that needs to be employed by the actuator to place the buoy 102 in the desired position, etc.

The objective of the controller 114 is to control the PTO 110 such that the power flow is maximized, e.g., the position of the buoy 102 with respect to waves 106 in the body of water, over time, conforms to the resonant frequency of the WEC 100. Specifically, the controller 114 can be designed to control the PTO 110 to output a mechanical force that places the WEC 100 at its resonant frequency. Design of the controller 114 is now described.

Mathematical Model

Figure 2:
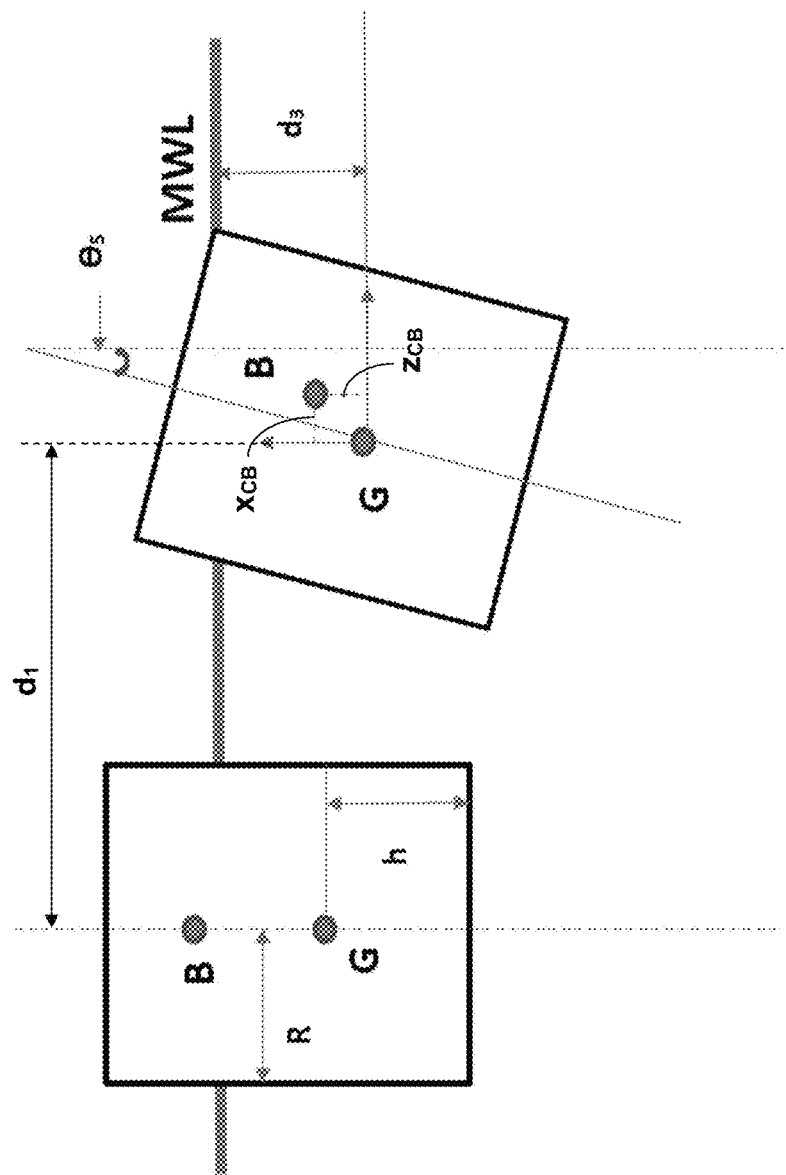
FIG. 2 is a schematic illustration of the geometry of a 3-DOF cylindrical buoy.

The dynamic model of a 3-DoF WEC is described below. FIG. 2 shows a typical geometry for a cylindrical buoy, where the surge displacement is $d_1$, the heave displacement is $d_3$, and the pitch rotation angle is $\theta_5$. The cylindrical buoy has a radius R and a mass m. MWL is the mean water level. The height between the center of gravity G and the bottom of the buoy is h. B denotes the center of buoyancy.

For a body-fixed frame located at the center of gravity of the buoy, the pitch restoring momentum can be written as:

$$T_y = -\rho g V x_{CB} \quad (1)$$

where $x_{CB}$ is the x-coordinate of the center of buoyancy expressed in the body-fixed frame, $\rho$ is the density of water, g is the gravitational acceleration, and the submerged volume is denoted as V. If the submerged volume is to be expressed in terms of $d_3$ and $\theta_5$, the following is obtained:

$$V = \pi R^2 \left( h + \frac{d_3}{\cos(\theta_5)} \right) \quad (2)$$

If the coordinates of the center of buoyancy are expressed by the parameters of the geometry of the buoy:

$$x_{CB} = \frac{\sin(\theta_5)(R^2\cos(\theta_5)^2 + R^2 + 4h^2\cos(\theta_5)^2 + 8hd_3\cos(\theta_5) + 4d_3^2)}{8\cos(\theta_5)(d_3 + h\cos(\theta_5))} \quad (3)$$

$$z_{CB} = \frac{(R^2\cos(\theta_5)^2 - R^2 + 4h^2\cos(\theta_5)^2 + 8hd_3\cos(\theta_5) + 4d_3^2)}{8(d_3 + h\cos(\theta_5))} \quad (4)$$

So, finally the restoring moment can be expressed in terms of the force an x-coordinate of center of buoyancy:

$$\tau_y = -\pi \rho g R^2 \sin(\theta_5)\left(h + \frac{d_3}{\cos(\theta_5)}\right) \quad (5)$$

$$\frac{(R^2\cos(\theta_5)^2 + R^2 + 4h^2\cos(\theta_5)^2 + 8hd_3\cos(\theta_5) + 4d_3^2)}{8\cos(\theta_5)(d_3 + h\cos(\theta_5))}$$

Eq. (5) can be linearized by applying Taylor expansion:

$$\tau_y \approx \frac{-\pi \rho g R^2}{4}(R^2 + 2h^2 + 4hd_3 + 2d_3^2)\theta_5 \quad (6)$$

The heave restoring force can be computed as:

$$F_h = \rho g \pi R^2 \left(\frac{d_3}{\cos(\theta_5)} - d_{30}\right) \quad (7)$$

$$\approx \rho g \pi R^2 \left(d_3\left(1 + \frac{\theta_5^2}{2}\right) - d_{30}\right)$$

where $d_{30}$ is the vertical position of the center of gravity at equilibrium, for $\theta_5=0$. Finally, the equations of motion of 3-DOF system are:

$$(m + m_\infty^{11})\ddot{d}_1 + m_\infty^{15}\ddot{\theta}_5 + b_1\dot{d}_1 + F_{rad}^1 + k_{moor}d_1 = F_e^1 + u_1 \quad (8)$$

$$(m + m_\infty^{33})\ddot{d}_3 + b_3\dot{d}_3 + F_{rad}^3 + \rho g \pi R^2\left(d_3\left(1 + \frac{\theta_5^2}{2}\right) - d_{30}\right) = F_e^3 + u_3 \quad (9)$$

$$(I_5 + I_\infty^{55})\ddot{\theta}_5 + I_\infty^{51}\ddot{d}_1 + b_5\dot{\theta}_5 + F_{rad}^5 + \frac{\pi \rho g R^2}{4}(R^2 + 2h^2 + 4hd_3 + 2d_3^2)\theta_5 = F_e^5 + u_5 \quad (10)$$

The radiation forces can be expressed as:

$$F_{rad}^1 = h_{11} * \dot{d}_1 + h_{15} * \dot{\theta}_5$$

$$F_{rad}^3 = h_{33} * \dot{d}_3$$

$$F_{rad}^5 = h_{51} * \dot{d}_1 + h_{55} * \dot{\theta}_5$$

where * denotes the convolution operator, and $h_{ij}$ are the radiation impulses.

Eqs. (8)-(10) are coupled and have high order terms which make the system nonlinear before linearization. The equation of motion of the heave mode can be linearized by ignoring the high order terms and can be decoupled with the other two modes after linearization. Since the heave motion is decoupled from the pitch-surge motions, the control problem for the heave mode can be solved independently from the pitch and surge modes. The simulation results described below will show energy harvested in the heave mode to compare it with the enemy absorption in the pitch and surge modes. For example, the heave control can be computed using a singular-arc control method which is a time domain implementation for the complex conjugate control. See O. Abdelkhalik et al., *Int. J. Control* 90(8), 1793 (2016); and J. Falnes, *Marine Structures* 20(4), 185 (2007); and U.S. application Ser. No. 15/830,752, filed Dec. 4, 2017 and titled "Multi-resonant feedback control of a single degree-of-freedom wave energy converter," which is incorporated herein by reference. Finally note that for optimal heave energy absorption, the heave system should be in resonance with the wave excitation force. The surge and pitch modes can also be linearized by dropping the high order terms, but there still is a nonlinear term which includes the product of $d_3$ and $\theta_5$ and the surge-pitch mode are coupled.

$$[M_{total}]\ddot{\vec{x}} + [C]\dot{\vec{x}} + [K]\vec{x} = \vec{F}_e + \vec{u} \quad (11)$$

where the excitation force vector $\vec{F}_e = [F_e^1, F_e^5]^T$, the control force vector $\vec{u} = [u_1, u_5]^T$, the matrix $[M_{total}]$ is summation of the mass of the rigid body $[M]$ and the added mass at infinite frequency $[M_\infty]$:

$$[M_{total}] = [M] + [M_\infty] = \begin{bmatrix} m & 0 \\ 0 & I_5 \end{bmatrix} + \begin{bmatrix} m_\infty^{11} & m_\infty^{15} \\ I_\infty^{51} & I_\infty^{55} \end{bmatrix}$$

the matrix $[C]$ is also expressed as the summation of viscous damping and radiation damping:

$$[C] = [B] + [R] = \begin{bmatrix} b_1 & 0 \\ 0 & b_5 \end{bmatrix} + \begin{bmatrix} h_{11} & h_{15} \\ h_{51} & h_{55} \end{bmatrix}$$

and the matrix $[K]$ is:

$$[K] = \begin{bmatrix} K_{11} & 0 \\ 0 & K_{55} \end{bmatrix}$$

where $K_{11} = K_{moor}$ is the mooring stiffness in surge direction.

$$K_{55} = \frac{\pi \rho g R^2}{4}(R^2 + 2h^2 + 4hd_3 + 2d_3^2) \quad (12)$$

Neglecting the term $d_{23}$ and keeping the $d_3$ term, then:

$$K_{55} \approx \frac{\pi \rho g R^2}{4}(R^2 + 2h^2 + 4hd_3) \quad (13)$$

$$K_c = \frac{\pi \rho g R^2}{4}(R^2 + 2h^2) \quad (14)$$

$$K_p(t) = \pi \rho g R^2 h d_3 \quad (15)$$

So the constant part of the stiffness of pitch mode can be denoted as $K_c$ and the time-varying part of the stiffness can be denoted as $K_p(t)$ which can be considered as a parametrically excited term. See B. Zaghari et al., "Mechanical modeling of a vibration energy harvester with time-varying stiffness", *Proceedings of the 9th International Conference on Structural Dynamics, EURODYN* 2014, Porto, Portugal, 30 Jun. 2 Jul. 2014. From the equation, the heave motion excites the pitch motion and also the surge motion because of the coupling between two modes.

Pseudo-Spectral Optimum Control

Figure 3:
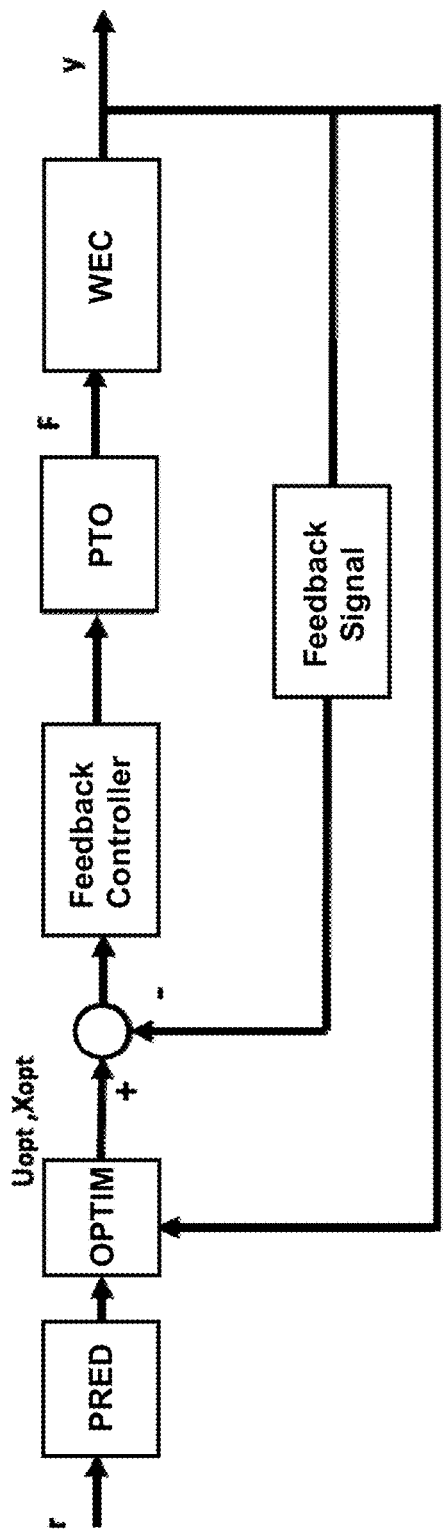
FIG. 3 is a diagram of the basic structure of a receding horizon or pseudo-spectral optimizer control system.

The basic structure for a receding horizon or pseudo-spectral control system is shown in FIG. 3. The basic structure can use both a feedforward block and an inner feedback loop. The block labeled PRED refers to the prediction part of feedforward control based on a reference signal r, which can be the wave excitation force. The prediction block predicts the value of the excitation force over a time horizon, which is used to optimize the PTO input. OPTIM refers to the pseudo-spectral optimizer used to generate the optimal control force, position and velocity information ($U_{opt}$, $X_{opt}$) based on wave prediction. Pseudo-spectral control employs optimization during execution to determine the control signal. The receding horizon procedure is repeated iteratively to compensate for disturbances and imperfect modeling by updating the current state of the system every time the optimization is carried out. Feedback refers to the fact that the output signal y can be measured and fed back to the control system that continuously reacts, based on current and past measurements, according to the control objective. With the receding horizon structure, a control decision is computed based on predictions over some finite future time. The current system state is measured and fed back as initial conditions at each time step in the controller computation.

System Approximation Using Fourier Series

The control forces and the states each are approximated by a linear combination of the basis functions, $\phi_k(t)$. For the WEC problem, and due to the periodic nature of the wave, it is intuitive to select a Fourier series as the basis functions. A truncated Fourier Series that has zero mean is used with N terms. Since there are both sine and cosine functions, N is an even number and is equal to twice the number of cosine (or sine) functions in the Fourier series. The vector of basis functions is:

$$\Phi(t) = \left[\cos(w_0 t), \sin(w_0 t), \ldots, \cos\left(\frac{N}{2}w_0 t\right), \sin\left(\frac{N}{2}w_0 t\right)\right]^T \quad (16)$$

where $\omega_0 = 2\pi/T_{end}$ is the fundamental frequency, and $T_{end}$ represents the total simulation time. The states and the controller can be approximated using $\Phi(t)$ as follows:

$$x_i(t) = \sum_{k=1}^{N/2} x_{ik}^c \cos(kw_0 t) + x_{ik}^s \sin(kw_0 t) = \Phi(t)\hat{x}_i \quad (17)$$

$$u_j(t) = \sum_{k=1}^{N/2} u_{jk}^c \cos(kw_0 t) + u_{jk}^s \sin(kw_0 t) = \Phi(t)\hat{u}_j \quad (18)$$

where in the above two equations, i is the state index, and j is the control index. In Eq. (17), $x_{ik}^c/x_{ik}^s$, denotes the $k_{th}$ coefficient of cosine/sine term of basis function for $i_{th}$ state. In Eq. (18), $u_{jk}^c/u_{jk}^s$, denotes the $k_{th}$ coefficient of cosine/sine term of basis function for jth control. The Fourier coefficients (or weight vectors) are grouped as follows:

$$\hat{x}_i(t) = \left[x_{i1}^c, x_{i1}^s, x_{i2}^c, x_{i2}^s, \ldots, x_{i\frac{N}{2}}^c, x_{i\frac{N}{2}}^s\right] \quad (19)$$

$$\hat{u}_j(t) = \left[u_{j1}^c, u_{j1}^s, u_{j2}^c, u_{j2}^s, \ldots, u_{j\frac{N}{2}}^c, u_{j\frac{N}{2}}^s\right] \quad (20)$$

In the problem, the variables that need to be optimized are the velocity of surge motion $v_s(t)$, the velocity of pitch rotation $v_p(t)$, the controller in surge direction $u_s(t)$ and the controller in pitch direction $u_p(t)$. Therefore, i=1,2; j=1,2:

$$v_s(t) \approx x_1(t) = \Phi(t)\hat{x}_1 \quad (21)$$

$$v_p(t) \approx x_2(t) = \Phi(t)\hat{x}_2 \quad (22)$$

$$u_s(t) \approx u_1(t) = \Phi(t)\hat{u}_2 \quad (23)$$

$$u_p(t) \approx u_2(t) = \Phi(t)\hat{u}_2 \quad (24)$$

The main advantage of selecting the Fourier Series to be the basis function is that the derivative and integration of the approximation can be computed easier than the other orthogonal polynomials. The differentiation of the approximated states can be expressed as:

$$\dot{x}_i = \dot{\Phi}(t)\hat{x}_i = \Phi(t)D_\phi \hat{x}_i \quad (25)$$

Because the basis function is the only time dependent term of the approximated states, and for a zero-mean Fourier Series, the derivative can be conveniently expressed as a matrix $D_\phi \in R^{N \times N}$. The matrix is block diagonal, where each block $D_\phi^k$ can be expressed as:

$$D_\phi^k = \begin{bmatrix} 0 & k\omega_0 \\ -k\omega_0 & 0 \end{bmatrix} \quad (26)$$

The integration of a state can also be found using a matrix as follows. Let the surge position of the buoy be $z_s(t)$, then:

$$z_s(t) \approx x_z(t) = \Phi(t)\hat{x}_z \quad (27)$$

$$\dot{x}_z = \Phi(t)D_\phi \hat{x}_z = \Phi(t)\hat{x}_1 \quad (28)$$

Hence the following can be written:

$$\hat{x}_z = D_\phi^{-1}\hat{x}_1 \quad (29)$$

where the matrix $D_\phi$ is invertible, and its inverse is the matrix used to compute the integration of a state. The integration matrix is still block diagonal. Each block of integration matrix can be written as:

$$D_\phi^{-k} = \begin{bmatrix} 0 & -\frac{1}{k\omega_0} \\ \frac{1}{k\omega_0} & 0 \end{bmatrix} \quad (30)$$

This state approximation can be used to approximate all other quantities that are functions of the states. The viscous damping in the surge direction $f_b^s$ can be expressed as:

$$f_b^s = B_{11}v_s = b_1\Phi(t)\hat{x}_1 \quad (31)$$

The hydrostatic force $f_h$ can be expressed as:

$$f_h = K_{11}z = K_{11}\Phi(t)\hat{x}_z = K_{11}\Phi(t)D_\phi^{-1}\hat{x}_1 \quad (32)$$

The radiation forces can also be approximated using this Fourier series representation for the states, eliminating the need for convolution integral evaluation. The radiation force in the surge mode can be written as:

$$f_{rad}^1 = \int_{-\infty}^{\infty} h_{11}(t-\tau)x_1^N(\tau)d\tau + \int_{-\infty}^{\infty} h_{15}(t-\tau)x_2^N(\tau)d\tau \quad (33)$$

$$= f_{rad}^{11} + f_{rad}^{15}$$

where each of the above two terms can be approximated as:

$$f_{rad}^{11} = (h_{11}*\Phi(t))\hat{x}_1 = \Phi(t)(G_{11} - m_\infty^{11}D_\phi)\hat{x}_1 \quad (34)$$

$$f_{rad}^{15} = (h_{15}*\Phi(t))\hat{x}_2 = \Phi(t)(G_{15} - m_\infty^{15}D_\phi)\hat{x}_2 \quad (35)$$

where $m_\infty$ denotes the added mass at infinite frequency. See G. Bacelli, "Optimal control of wave energy converters," Ph.D. dissertation, Dept. Electronic Engineering, National Univ. Ireland, Maynooth, Ireland, 2014. The matrix $G \in R^{N \times N}$ is block diagonal, the k-th block is:

$$G_k = \begin{bmatrix} R(k\omega_0) & k\omega_0 A(k\omega_0) \\ -k\omega_0 A(k\omega_0) & R(k\omega_0) \end{bmatrix} \quad (36)$$

The excitation force can also be approximated by Fourier Series.

$$F_e^1 \approx \Phi(t)\hat{e}_1 \quad (37)$$

$$F_e^5 \approx \Phi(t)\hat{e}_2 \quad (38)$$

Substituting these approximated forces and states in the system's dynamics Eq. (11), the following is obtained:

$$r_1 = ((m+m_\infty^{11})\Phi D_\phi + b_1 \Phi + K_{11}\Phi D_\phi^{-1} + h_{11}*\Phi)\hat{x}_1 - \Phi\hat{e}_1 - \Phi\hat{u}_1 + (m_\infty^{15}\Phi D_\phi + h_{15}*\Phi)\hat{x}_2 \quad (39)$$

$$r_2 = ((I_5+I_\infty^{55})\Phi D_\phi + b_5 \Phi + K_{55}\Phi D_\phi^{-1} + h_{55}*\Phi)\hat{x}_2 - \Phi\hat{e}_2 - \Phi\hat{u}_2 + (I_\infty^{51}\Phi D_\phi + h_{51}*\Phi)\hat{x}_1 \quad (40)$$

where $r_1$ and $r_2$ are residuals due to the approximation. In the Galerkin method, the residuals are orthogonal to the basis function. That is:

$$\langle r_1, \phi_j \rangle = 0 \quad (41)$$

$$\langle r_2, \phi_j \rangle = 0 \quad (42)$$

where $j=1, \ldots, N$. This implies that the residuals vanish at all the collocation points.

Control Optimization for Linear Time-Invariant WECs

The optimization objective is to maximize the harvested energy defined as:

$$E = -\int_0^T \vec{u}^T \vec{v} \, dt \quad (43)$$

Hence, the optimization problem can be thought of as minimizing an objective function J defined as:

$$J = \int_0^T \vec{u}^T \vec{v} \, dt = \int_0^T (u_1 v_s + u_2 v_p) dt \quad (44)$$

Using the Fourier series approximation, the following is obtained:

$$J \approx \tilde{J} = \int_0^T (\hat{u}_1 \Phi^T(t)\Phi(t)\hat{x}_1 + \hat{u}_2 \Phi^T(t)\Phi(t)\hat{x}_2) dt = \frac{T}{2}(\hat{u}_1 \hat{x}_1 + \hat{u}_2 \hat{x}_2) \quad (45)$$

So, the optimal control problem is to minimize Eq. (45) subject to Eqs. (39) and (40). For the system with constant pitch stiffness $K_{55}$=Const, the equation of motion can be written in matrix form as:

$$\begin{bmatrix} F_{11} & F_{12} \\ F_{21} & F_{22} \end{bmatrix} \begin{bmatrix} \hat{x}_1 \\ \hat{x}_2 \end{bmatrix} = \begin{bmatrix} \hat{u}_1 \\ \hat{u}_2 \end{bmatrix} + \begin{bmatrix} \hat{e}_1 \\ \hat{e}_2 \end{bmatrix} \quad (46)$$

where $F_{ij}$ are given as a block diagonal matrix.

$$F_{ij}^k = \begin{bmatrix} D_{ij}^k & M_{ij}^k \\ -M_{ij}^k & D_{ij}^k \end{bmatrix} \quad (47)$$

where i, j=1, 2.

$$\begin{cases} D_{ij}^k = R_{ij}(k\omega_0) + B_{ij} \\ M_{ij}^k = k\omega_0(M_{ij} + A_{ij}(k\omega_0)) - K_{ij}/(k\omega_0) \end{cases}$$

where $A_{ij}(k\omega_0)$ denotes the added mass at k-th frequency of i-th mode due to j-th mode. So, if the equation of motion is written in a more condense form, the following is obtained:

$$F\hat{x} = \hat{u} + \hat{e} \quad (48)$$

So $$\hat{x} = F^{-1}(\hat{u} + \hat{e}) \quad (49)$$

The cost function can also be written in matrix form:

$$\tilde{J} = \frac{T}{2}\hat{u}^T \hat{x} \quad (50)$$

substitute Eq. (49) into the objective function Eq. (50) to obtain:

$$\tilde{J} = \frac{T}{2}(\hat{u}^T F^{-1} \hat{u} + \hat{u}^T F^{-1} \hat{e}) \quad (51)$$

It is possible to solve for the optimal control analytically by setting the partial derivative of $\tilde{J}$ with respect to the control to zero; that is $$\frac{\partial \tilde{J}}{\partial u} = 0.$$

Hence:

$$\hat{u}^* = -(F^{-1} + F^{-T})^{-1} F^{-1} \hat{e} \quad (52)$$

Control Optimization for Linear Time-Varying WECs

When the pitch stiffness is a function of the heave amplitude, the pitch stiffness term $K_{55}$ has a time-varying term $K_p(t)$. This is usually referred to as parametric excitation since the heave motion excites the pitch motion, which is coupled with the surge. Then the system becomes a time varying system. This affects the second constraint Eq. (40) which becomes as follows in a linear time-varying WEC:

$$r_2 = ((I_5+I_\infty^{55})\Phi D_\phi + b_5 \Phi + (K_c+K_p)\Phi D_\phi^{-1} + h_{55}*\Phi)\hat{x}_2 - \Phi\hat{e}_2 - \Phi\hat{u}_2 + (I_\infty^{51}\Phi D_\phi + h_{51}*\Phi)\hat{x}_1 \quad (53)$$

The time-varying stiffness can be approximated as:

$$K_p(t) = \Phi(t)\hat{s} \quad (54)$$

So, the $r_2$ residual can be expressed as:

$$r_2 = ((I_5+I_\infty^{55})\Phi D_\phi + b_5 \Phi + K_c \Phi D_\phi^{-1} + \Phi\hat{s}\Phi D_\phi^{-1} + h_{55}*\Phi)\hat{x}_2 - \Phi\hat{e}_2 - \Phi\hat{u}_2 + (I_\infty^{51}\Phi D_\phi + h_{51}*\Phi)\hat{x}_1 \quad (55)$$

The $r_1$ residual remains the same. The residuals can be discretized at collocation points:

$$r_1^j = ((m+m_\infty^{11})\Phi_j D_\phi + b_1 \Phi_j + K_{11} \Phi_j D_\phi^{-1} + h_{11}*\Phi_j)\hat{x}_1 - \Phi_j \hat{\varepsilon}_1 - \Phi_j \hat{u}_1 + (m_\infty^{15} \Phi_j D_\phi + h_{15}*\Phi_j)\hat{x}_2 \quad (56)$$

$$r_2^j = ((I_5+I_\infty^{55})\Phi_j D_\phi + b_5 \Phi_j + K_c \Phi_j D_\phi^{-1} + \Phi_j \hat{s} \Phi_j D_\phi^{-1} + k_{55}*\Phi_j)\hat{x}_2 - \Phi_j \hat{\varepsilon}_2 - \Phi_j \hat{u}_2 + (I_\infty^{51} \Phi_j D_\phi + k_{51}*\Phi_j)\hat{x}_1 \quad (57)$$

where $\Phi_j = \Phi(t_j)$, the nodes $t_j$ are uniformly spaced between 0 and $T_{end}$:

$$t_j = j\delta t \text{ with } \delta t = T_{end}/(N-1) \text{ and } j = 0, \ldots, N-1 \quad (58)$$

The objective function will be the same as the time-invariant system in Eq. (45). To solve for the control, a Nonlinear Programming (NLP) approach can be implemented. The NLP goal is then to minimize Eq. (45), subject to Eqs. (56) and (57), which have a total of 2N equality constraints.

Numerical Results

In all the numerical test cases, a buoy is assumed of cylindrical shape with a tapered end which is similar to the buoy described elsewhere. See D. Bull et al., "Design of a physical point-absorbing wec model on which multiple control strategies will be tested at large scale in the mask basin", *International Offshore and Polar Engineering Conference (ISOPE2015)*, 2015. The radius of the buoy is 0.8604 m in the cylindrical part, and its cross-sectional area is 2.3257 m². The mass of the buoy is 858.3987 kg.

Both regular and irregular waves are tested. The regular wave has a wave amplitude of 0.6 m. The irregular wave has a Bretschneider spectrum, with a significant height of 1.2 m and a peak period of 1.5708 seconds. The Bretschneider spectrum is realized using 1260 frequencies. The step for updating the control is set to 0.01 seconds.

The comparison is made between the system with and without parametric excitation. The details for the velocity of surge and pitch motions are described below. The velocities are plotted along with the excitation force to analyze the system response.

No Parametric Excitation

Figure 4:
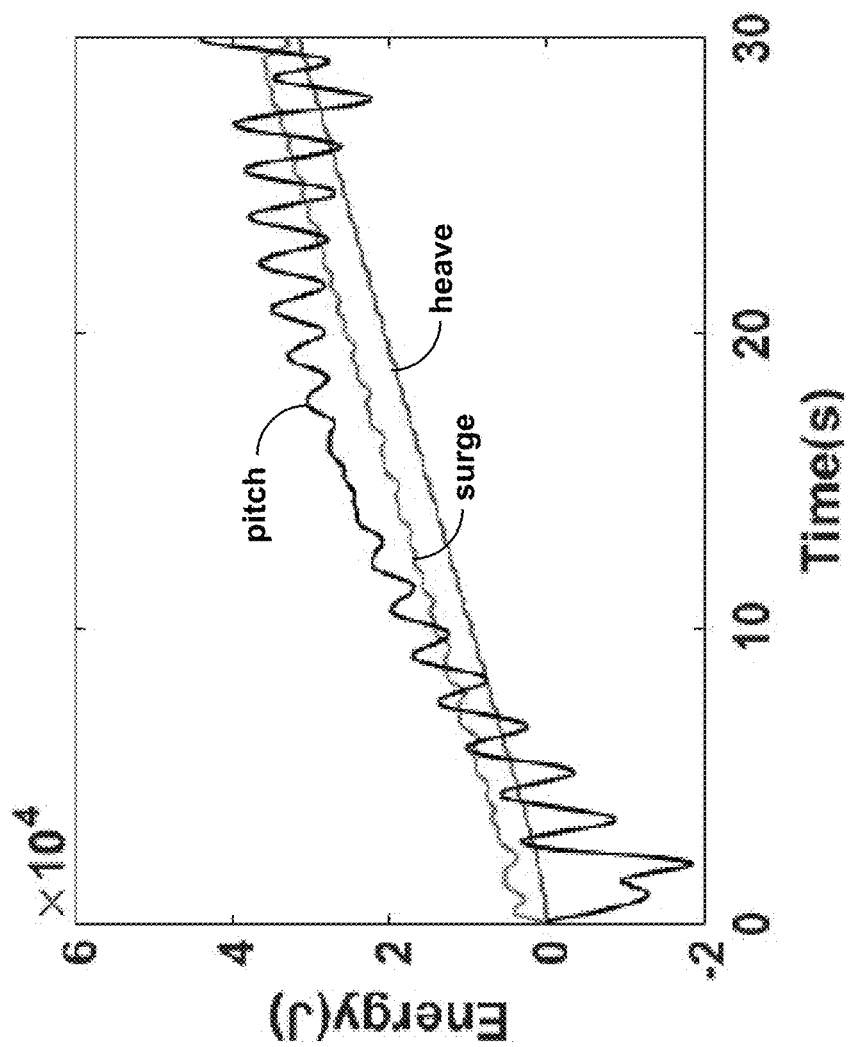
FIG. 4 is a graph showing the energy extracted in pitch and surge compared to heave extracted energy with no parametric excitation.
Figure 5:
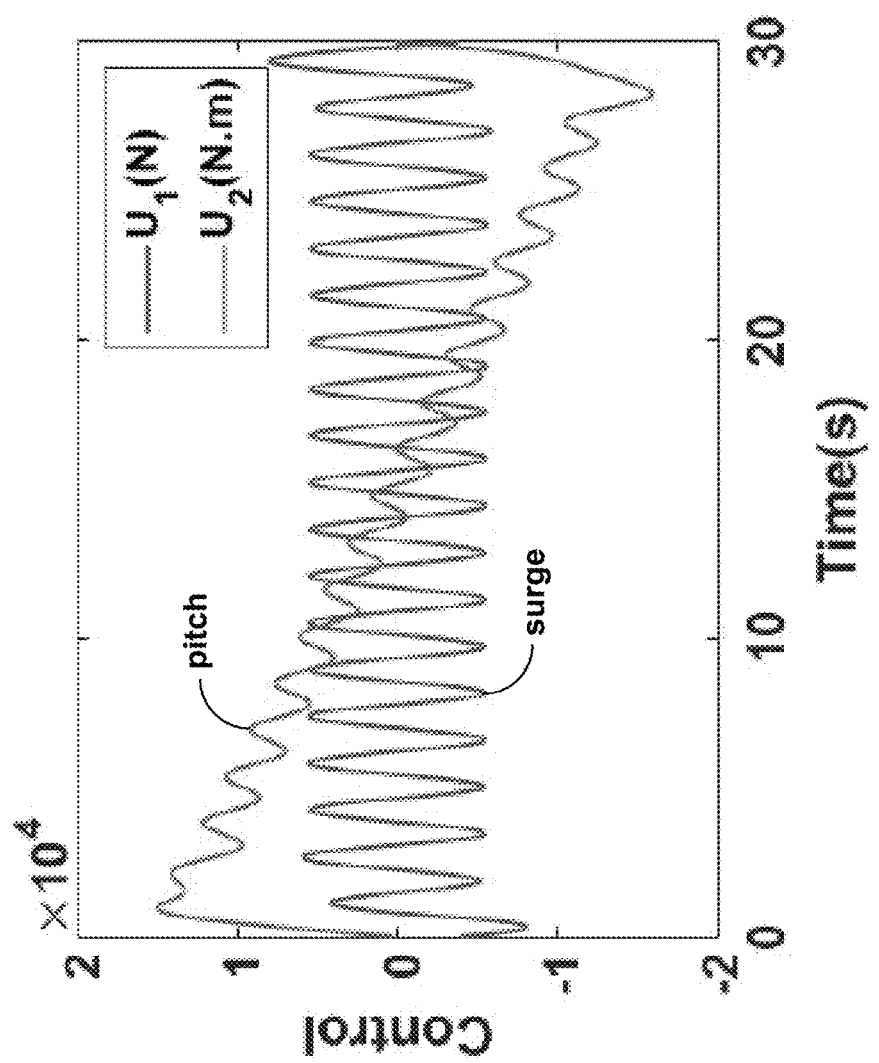
FIG. 5 is a graph of the control force in pitch (U2) and surge (U1).
Figure 6:
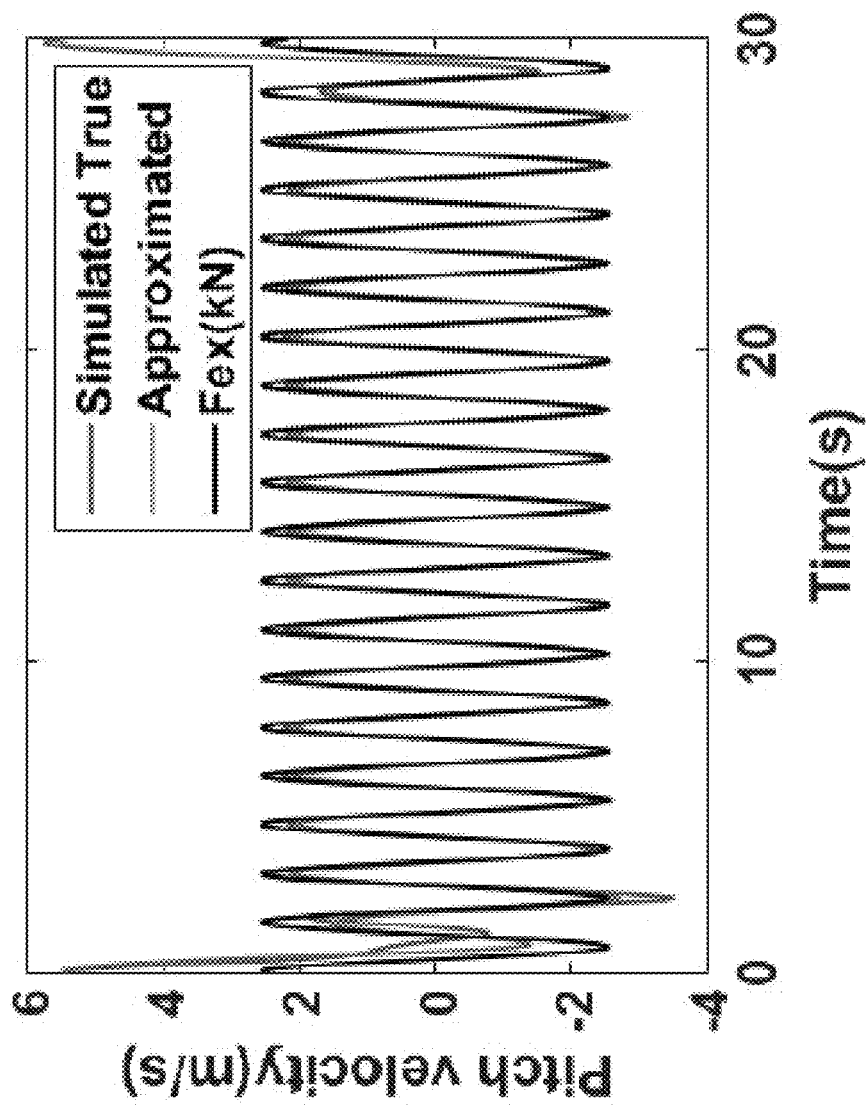
FIG. 6 is a graph of the velocity of pitch motion.
Figure 7:
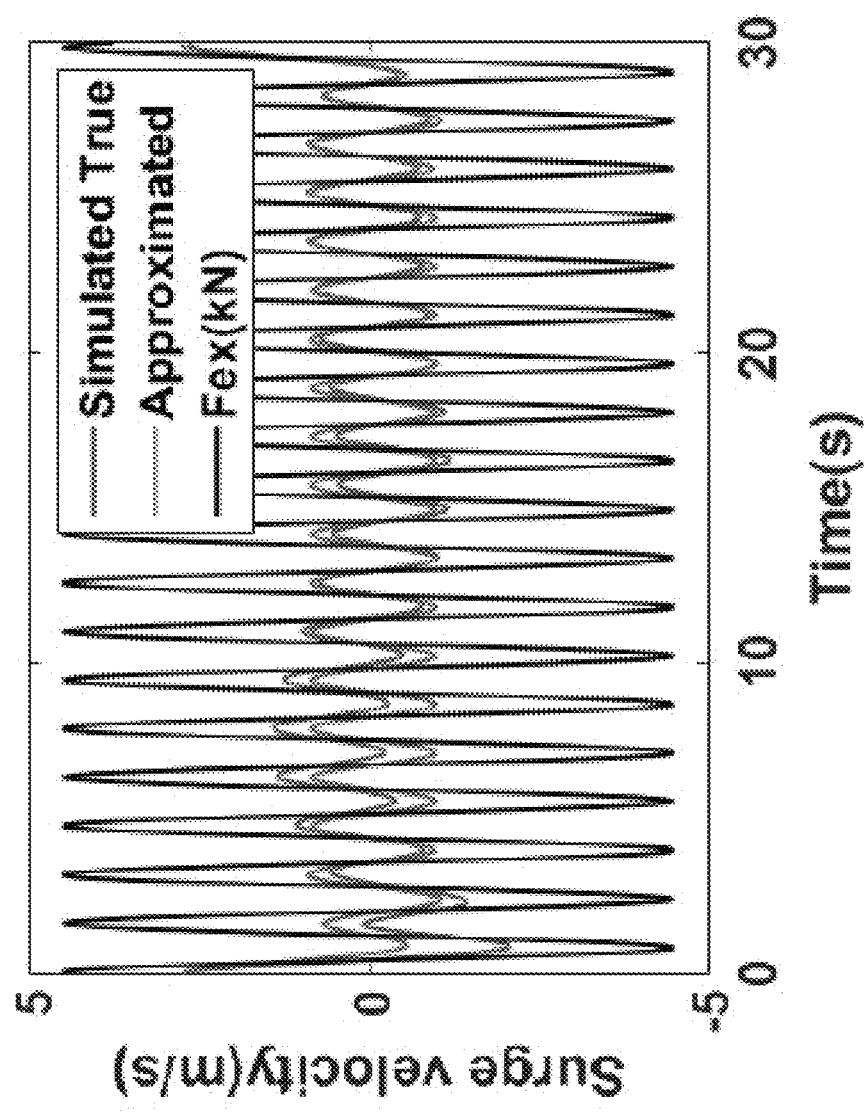
FIG. 7 is a graph of the velocity of surge motion.

This section presents numerical results for the linear time invariant WEC. A regular wave is used in this simulation. The number of basis functions is N=80 in this case. The energy captured by surge, heave, pitch is shown in FIG. 4. The total absorbed energy is around 3.5 times the energy absorbed from only heave mode. The control force is shown in FIG. 5 while the velocity of surge and pitch modes respectively are shown in FIGS. 6 and 7. In these two figures, the excitation force is scaled to show the resonance between the velocity and the excitation force which indicates optimality is achieved. In these figures, both the true velocities as well as the approximated velocities are plotted.

Parametric Excited Surge-Pitch Motions

Figure 8:
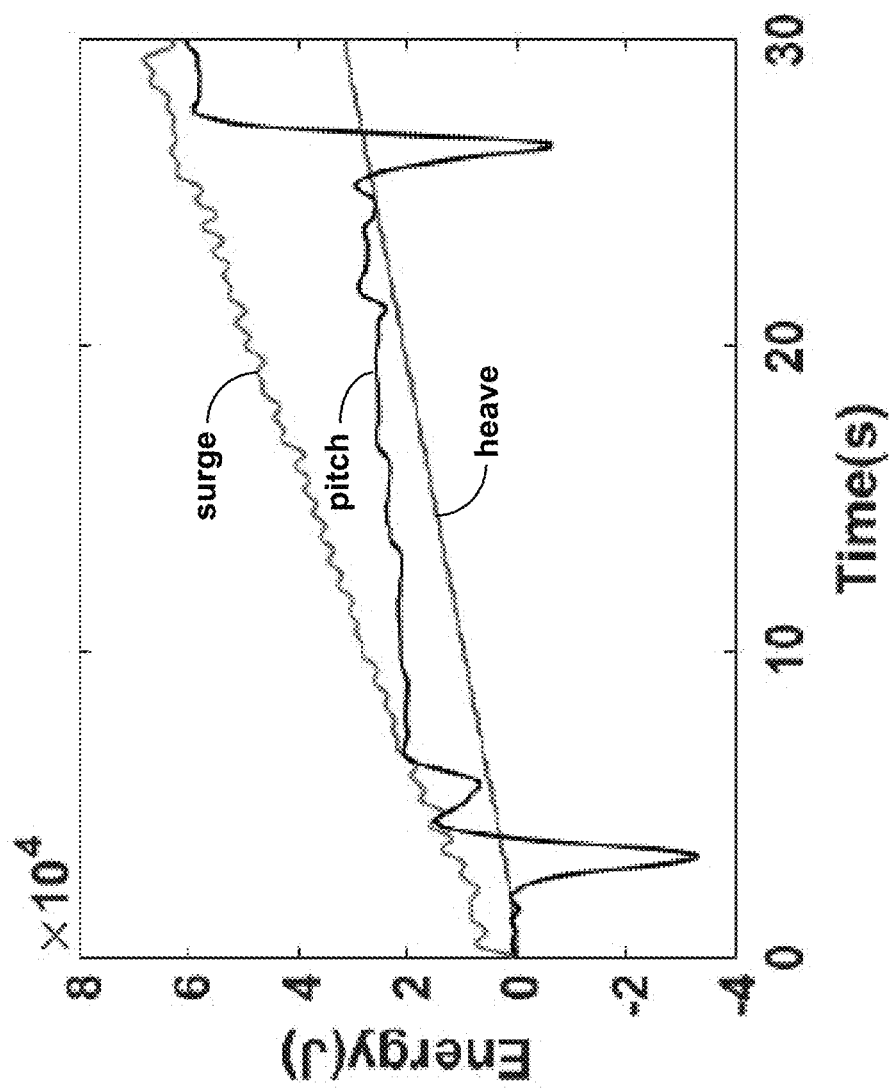
FIG. 8 is a graph showing the energy extracted in pitch and surge compared to heave extracted energy with parametric excitation.
Figure 9:
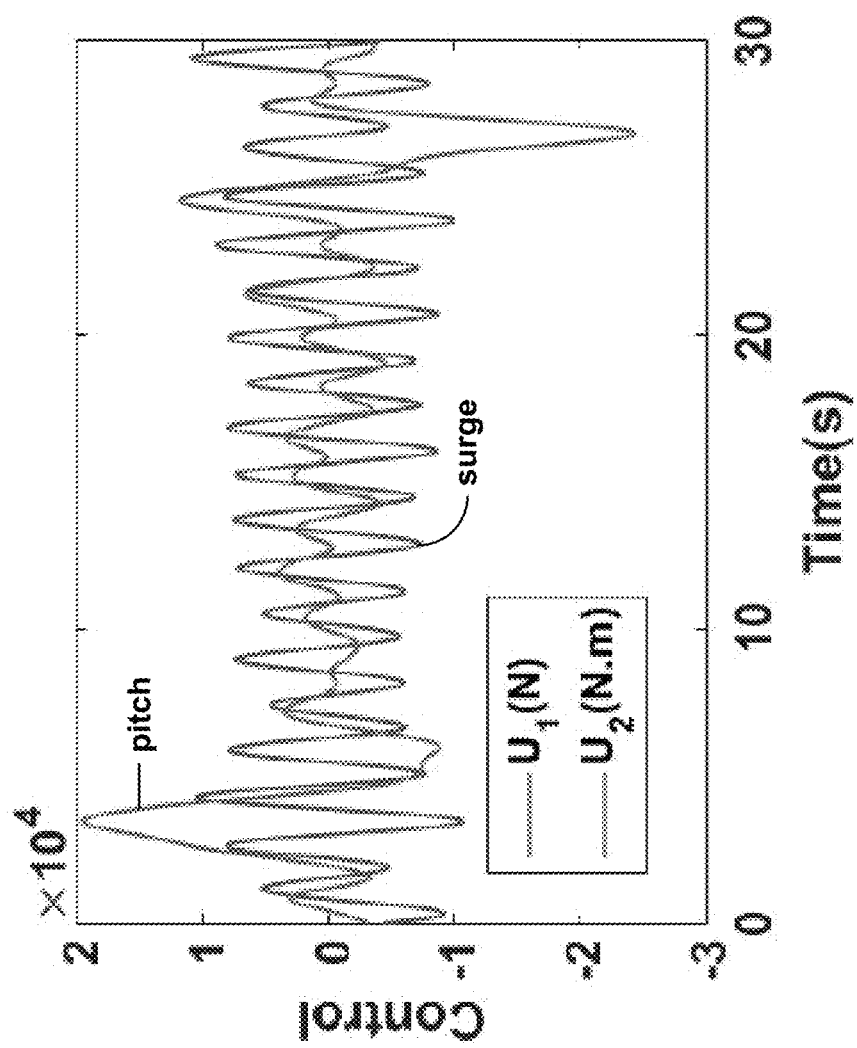
FIG. 9 is a graph of the control force in pitch (U2) and surge (U1).
Figure 10:
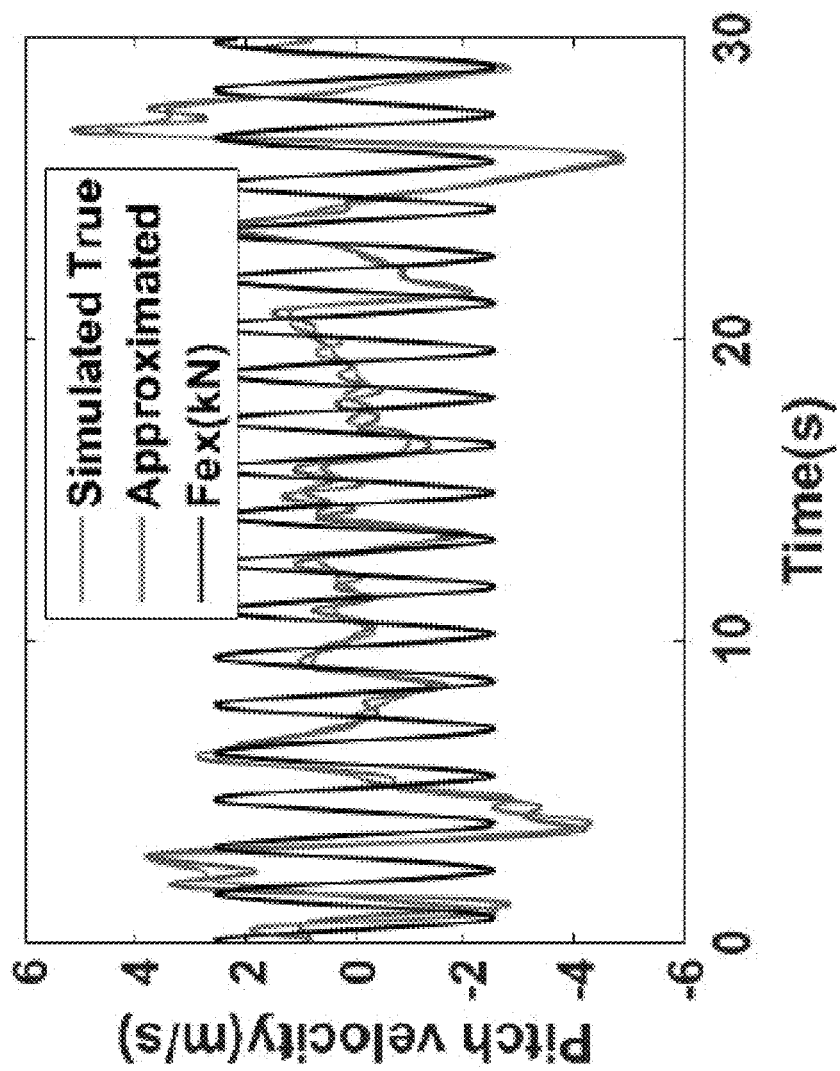
FIG. 10 is a graph of the velocity of pitch motion.
Figure 11:
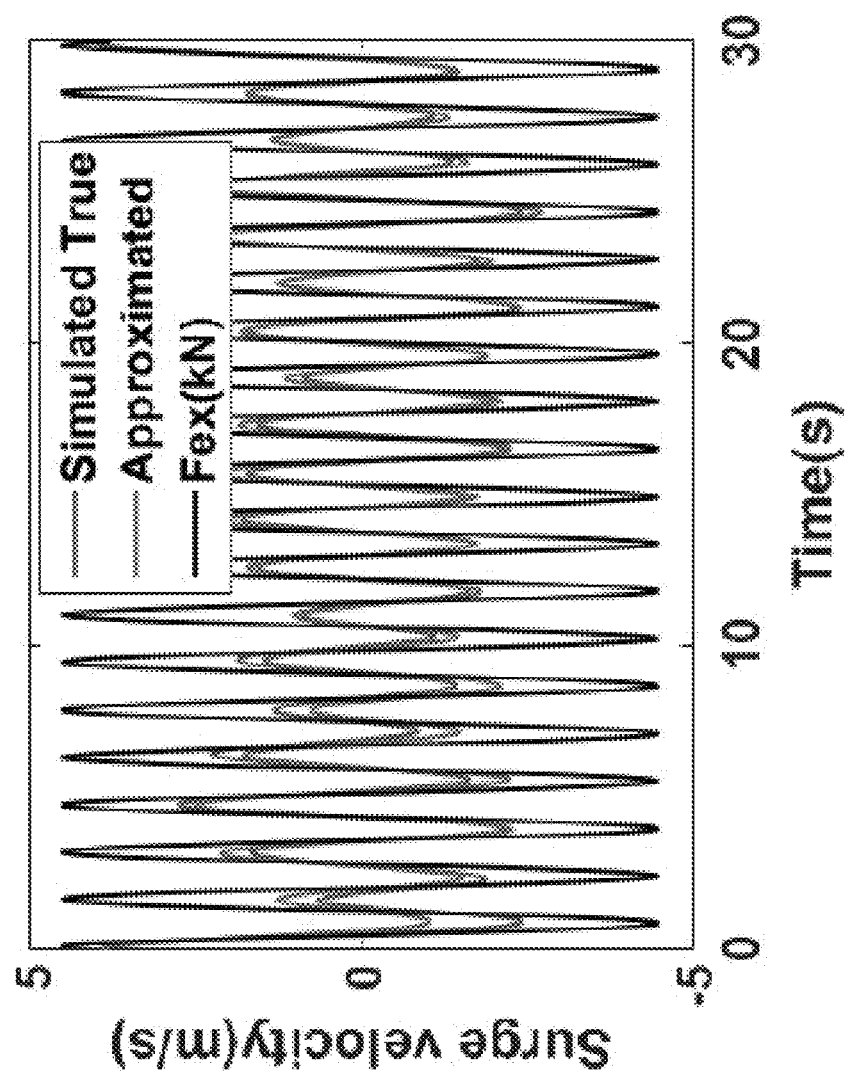
FIG. 11 is a graph of the velocity of surge motion.

This section presents numerical results for the linear time varying WEC. A regular wave is used in this simulation. A Nonlinear Programming approach is implemented for computing the controller numerically. The number of basis functions is N=160. The energy captured by the three modes is shown in FIG. 8. The energy extracted from surge mode is $6.374 \times 10^4$ Joules, from the heave mode is $3.153 \times 10^4$ Joules, and from the pitch mode is $6.078 \times 10^4$ Joules within 30 seconds. The energy captured in the three modes is about 4.95 times the energy captured by heave mode only. Compared to the non-parametric excited system described above, this parametric excited system captures much more energy, about 1.4 times that of the non-parametric excited system. The controller is shown in FIG. 9 for both surge and pitch modes. FIGS. 10 and 11 show the velocities of the pitch and surge motions.

Parametric Excited WEC in Bretschneider Wave

Figure 12:
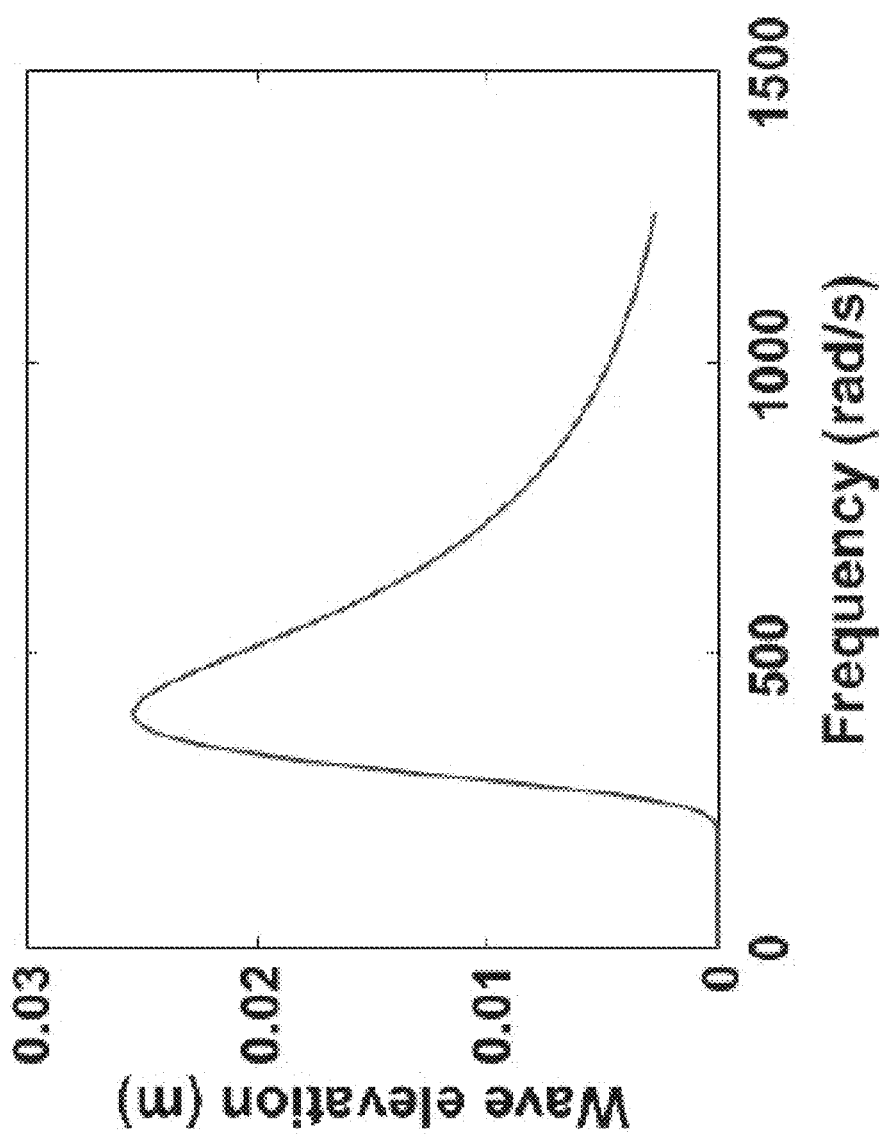
FIG. 12 is a graph of the Bretschneider wave amplitude.
Figure 13:
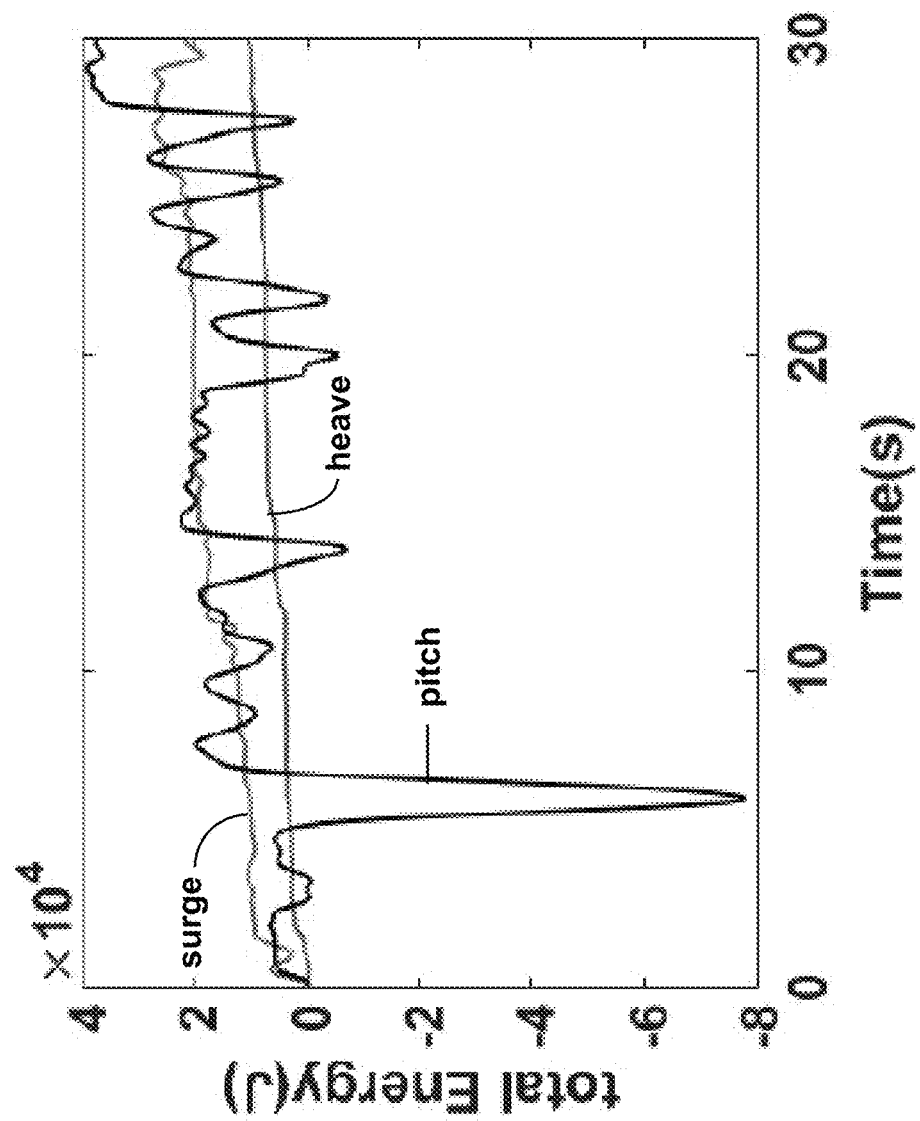
FIG. 13 is a graph showing the total energy harvested for a parametric excited WEC in a Bretschneider wave.
Figure 14:
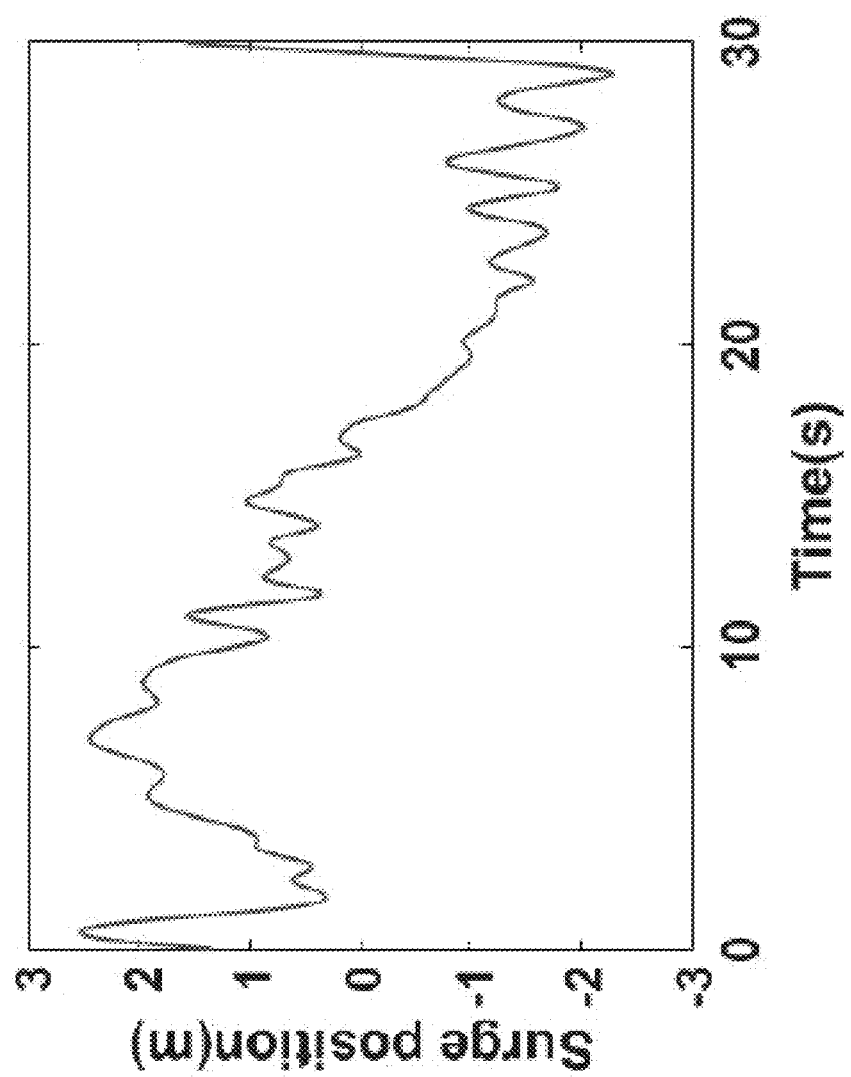
FIG. 14 is a graph of the surge position in a Bretschneider wave.
Figure 15:
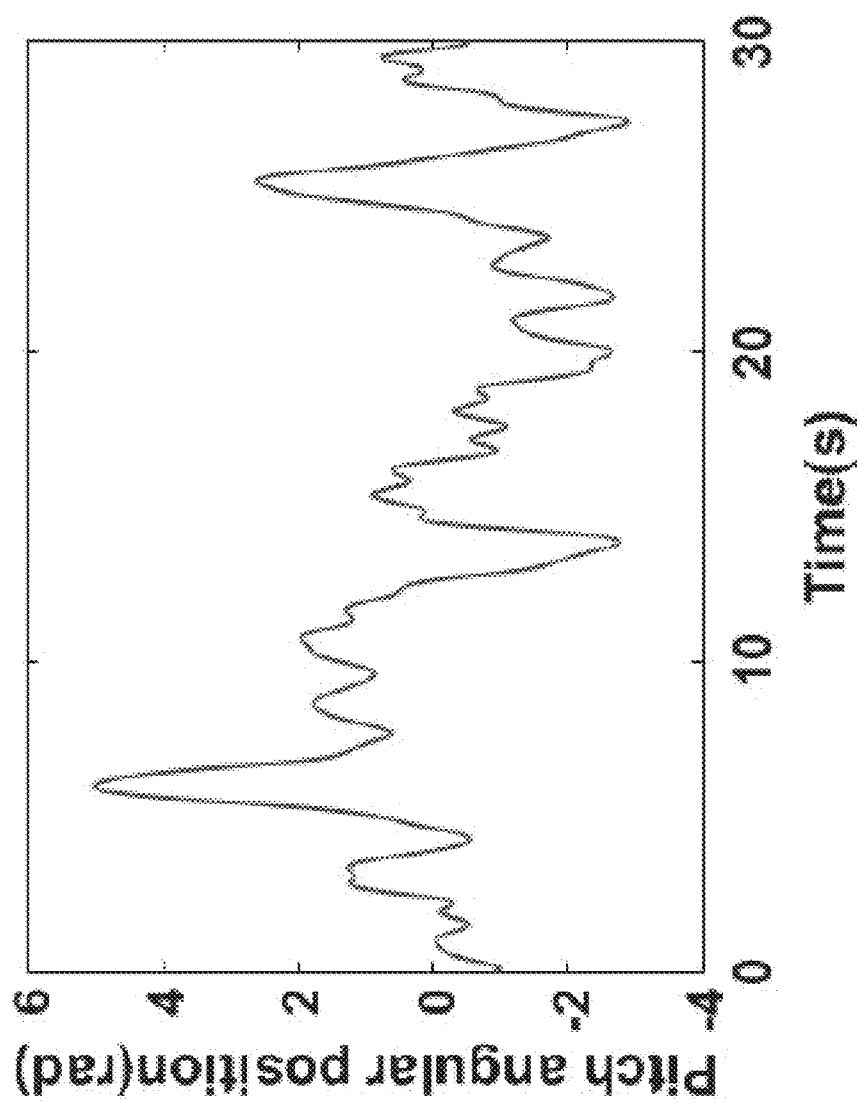
FIG. 15 is a graph of the pitch rotation in a Bretschneider wave.
Figure 16:
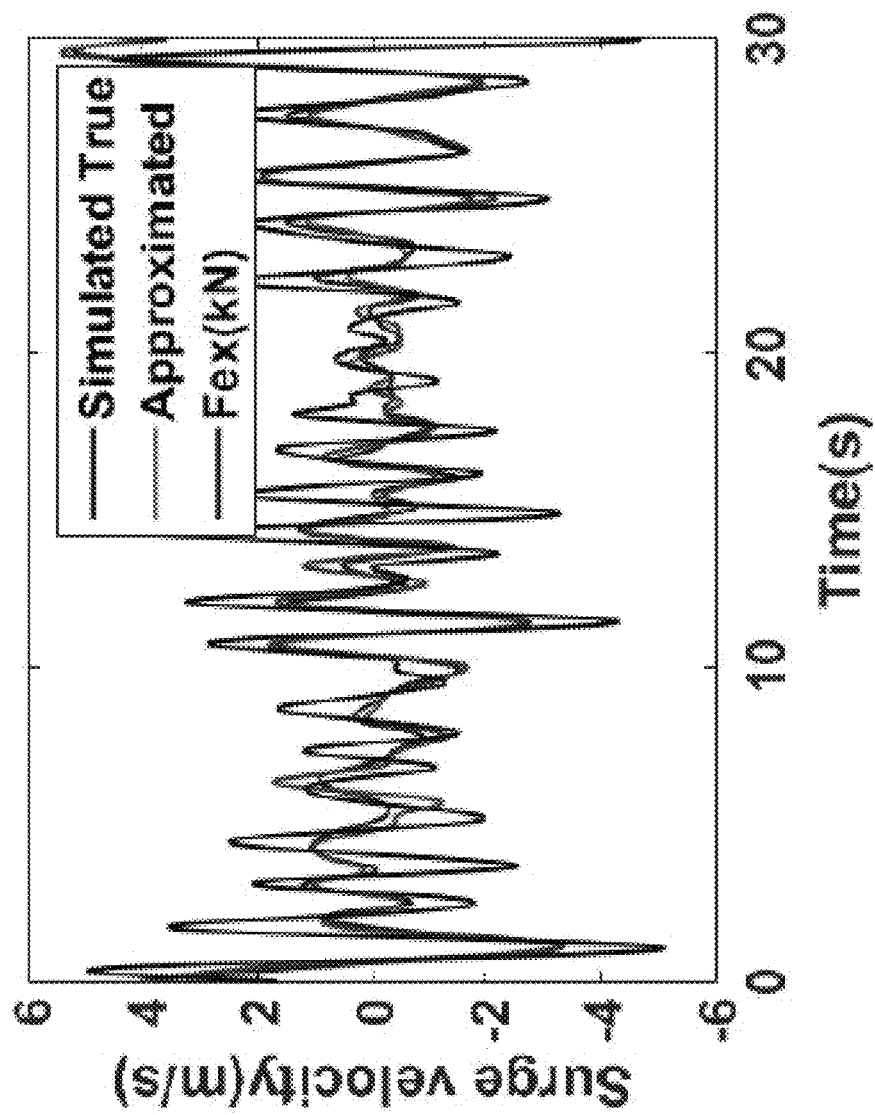
FIG. 16 is a graph of the surge velocity in a Bretschneider wave.
Figure 17:
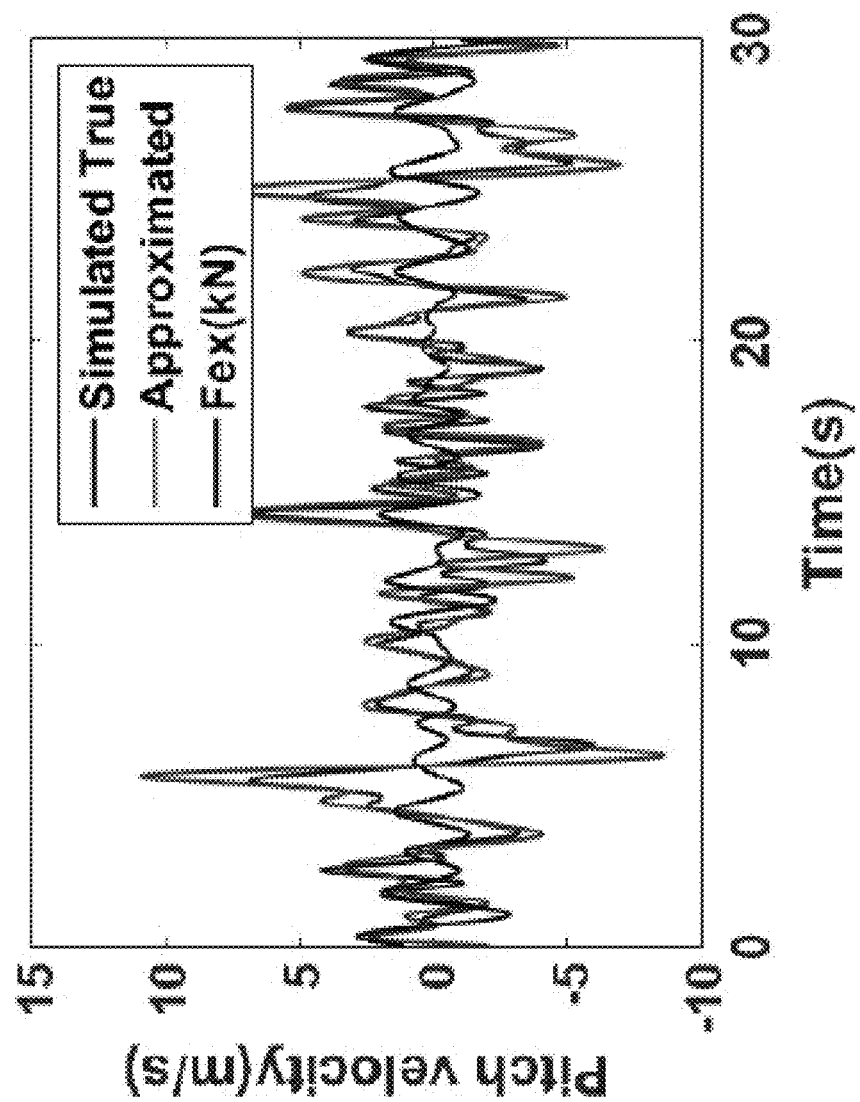
FIG. 17 is a graph of the pitch angular velocity in a Bretschneider wave.
Figure 18:
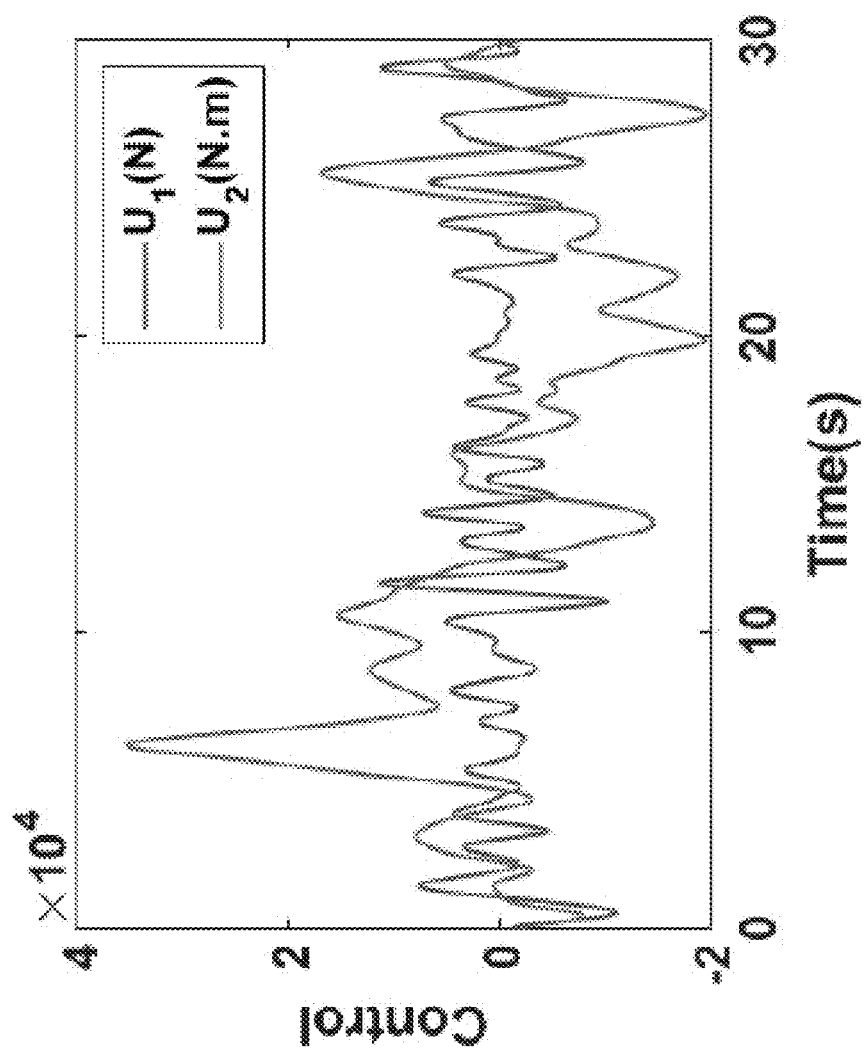
FIG. 18 is a graph of the control force in surge (U1) and pitch (U2) direction.

The irregular wave is also tested to simulate a more realistic case. An irregular wave with Bretschneider spectrum of 1.2 m significant height, 1.5708 seconds peak period and random initial phase for different frequencies is applied. The wave amplitude versus frequency is shown in FIG. 12. FIG. 13 shows the surge, heave and pitch energy captured a Bretschneider wave is applied. The pitch energy is the highest energy compared to the other motions. There is some transient response initially, but the energy keeps growing at steady state. The total energy is around 6.55 times the energy from heave mode only. The surge position and pitch rotation are shown in FIGS. 14 and 15, respectively. The velocity of surge motion and the angular velocity of pitch rotation are shown in FIGS. 16 and 17. Because of the parametric excitation, the optimal profile of pitch motion is not resonant with the excitation force. The control forces along the pitch and surge modes are plotted in FIG. 18.

Comparison Between Direct Transcription and Nonlinear MPC

Figure 19:
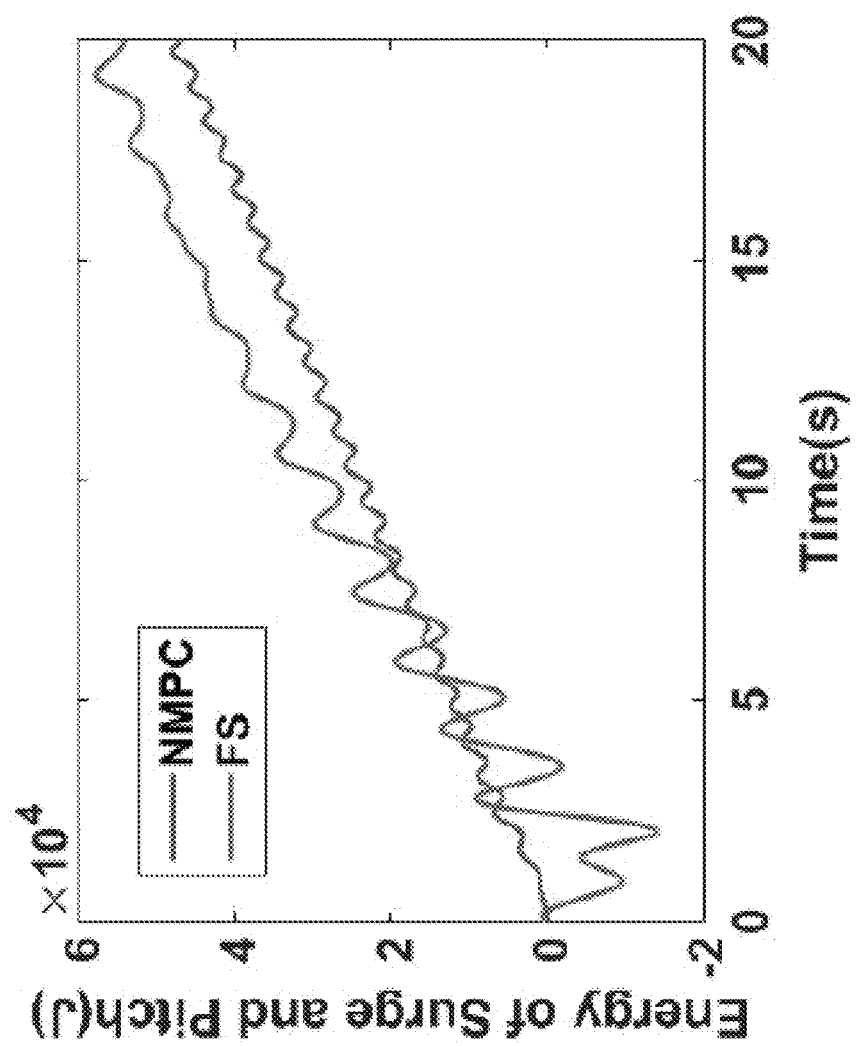
FIG. 19 is a graph showing the energy comparison between a FS controller and a NMPC controller.
Figure 20:
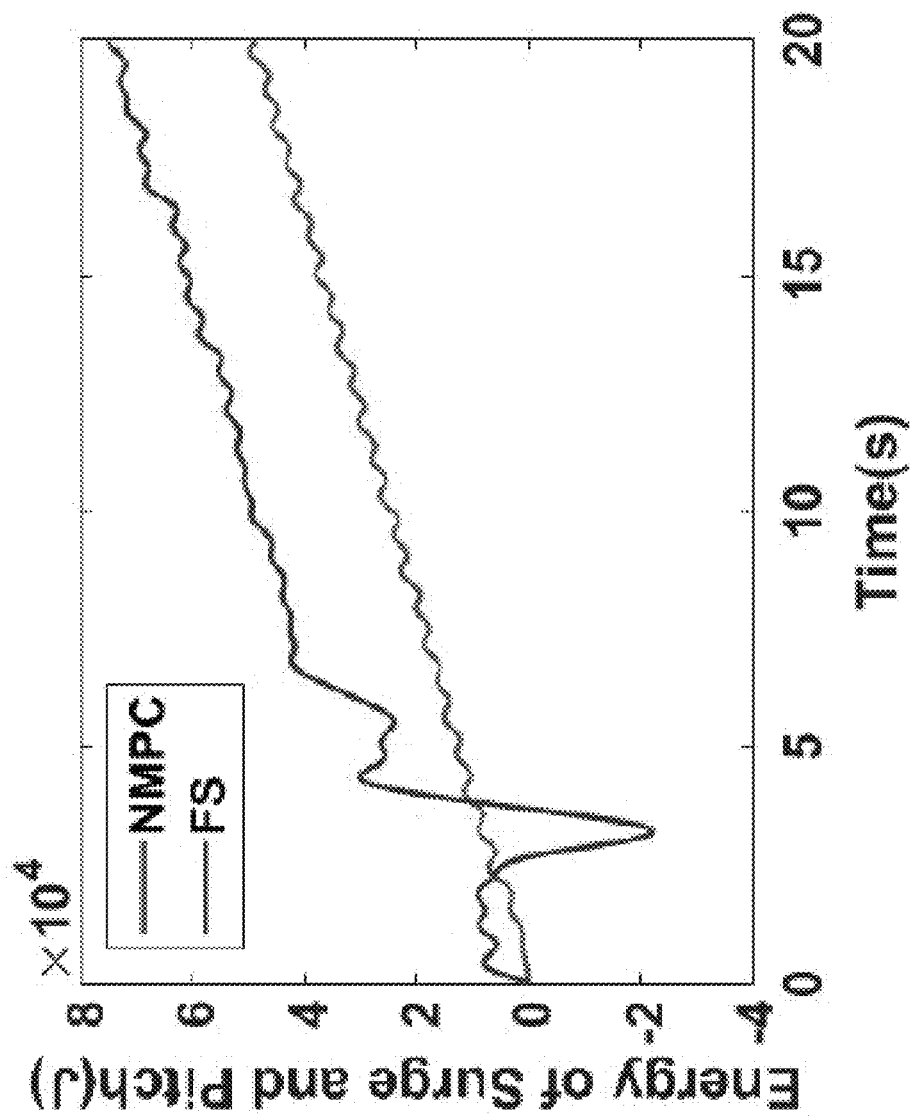
FIG. 20 is a graph showing the energy comparison between a FS controller and a NMPC controller.
Figure 21:
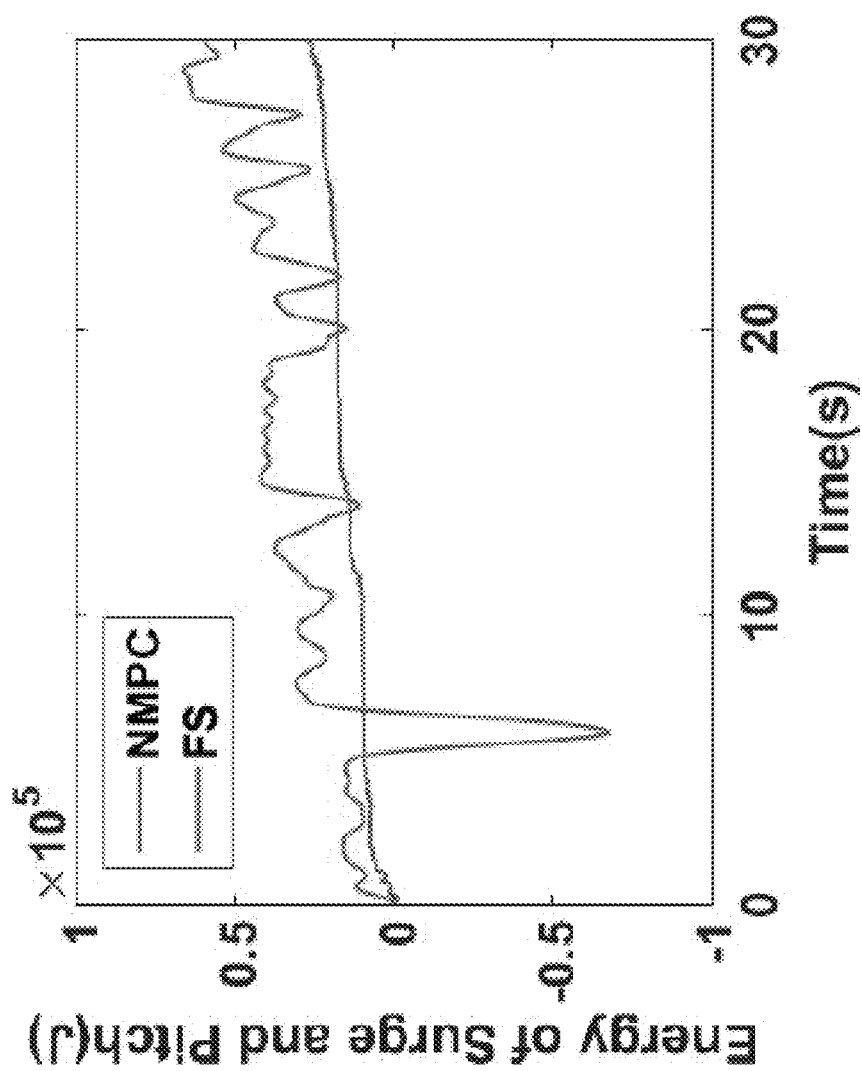
FIG. 21 is a graph showing the energy comparison between a FS controller and a NMPC controller.

A nonlinear model predictive control (NMPC) was developed in related U.S. Application No. 15/837,885, titled "Model predictive control of parametric excited pitch-surge modes in wave energy converters." This section compares the NMPC and the Direct Transcription Control in terms of optimizing the objective function. First, a regular wave is used to test both controllers for a non-parametric excited WEC. The harvested energy in each case is shown in FIG. 19. FIG. 20, on the other hand, shows the harvested energy for both controllers for a parametric excited WEC in a regular wave. Using an irregular wave with a Bretschneider spectrum of a significant wave height of 1.2 m, both controllers were tested on a parametric excited WEC. The harvested energy is plotted in FIG. 21. In all the cases above, the direct transcription control was able to harvest higher energy compared to the NMPC.

The present invention has been described as a pseudo-spectral method to control three-degree-of-freedom wave energy converters. It will be understood that the above description is merely illustrative of the applications of the principles of the present invention, the scope of which is to be determined by the claims viewed in light of the specification. Other variants and modifications of the invention will be apparent to those of skill in the art.

We claim:
1. A multi-resonant multiple degree-of-freedom wave energy converter, comprising:
   a buoy in a water environment having a wave motion, wherein the waves impacting the buoy exert an excitation force with a plurality of excitation frequencies that causes a buoy motion in heave, surge, and pitch directions relative to a reference,
   a power take-off that is configured to apply control forces in the heave, surge, and pitch directions to the buoy and harvest mechanical energy of the buoy motion, a predictor that is configured to predict the excitation force of the wave impacting the buoy in a future time horizon, and a controller that causes the power take-off to apply a force to the buoy to put the heave motion in resonance with the predicted wave excitation force in the heave direction and wherein the control forces in the surge and pitch directions are optimized using a pseudo-spectral control method to maximize parametric excitation of the surge-pitch motion by the heave motion.

2. The wave energy converter of claim 1, wherein the force in the heave direction is computed using a singular-arc control method.

* * * * *